US008078607B2

(12) United States Patent
Oztekin et al.

(10) Patent No.: US 8,078,607 B2
(45) Date of Patent: Dec. 13, 2011

(54) GENERATING WEBSITE PROFILES BASED ON QUERIES FROM WEBISTES AND USER ACTIVITIES ON THE SEARCH RESULTS

(75) Inventors: Bilgehan Uygar Oztekin, Mountain View, CA (US); Adam J. Klein, San Francisco, CA (US); Taher H. Haveliwala, Fremont, CA (US); Glen Jeh, San Francisco, CA (US); Sepandar D. Kamvar, San Francisco, CA (US)

(73) Assignee: Google Inc., Mountain View, CA (US)

( * ) Notice: Subject to any disclaimer, the term of this patent is extended or adjusted under 35 U.S.C. 154(b) by 854 days.

(21) Appl. No.: 11/394,620

(22) Filed: Mar. 30, 2006

(65) Prior Publication Data
US 2007/0239680 A1   Oct. 11, 2007

(51) Int. Cl.
*G06F 7/00*   (2006.01)
(52) U.S. Cl. ........................................................ 707/708
(58) Field of Classification Search .................. None
See application file for complete search history.

(56) References Cited

U.S. PATENT DOCUMENTS

| | | | | |
|---|---|---|---|---|
| 5,724,567 A | 3/1998 | Rose et al. | ..................... | 395/602 |
| 5,754,939 A | 5/1998 | Herz et al. | ..................... | 455/4.2 |
| 6,012,051 A | 1/2000 | Sammon, Jr. et al. | .......... | 706/52 |
| 6,182,068 B1 * | 1/2001 | Culliss | .............................. | 707/5 |
| 6,285,999 B1 | 9/2001 | Page | ................................ | 707/5 |
| 6,327,590 B1 | 12/2001 | Chidovskii et al. | ................ | 707/5 |
| 6,338,066 B1 | 1/2002 | Martin et al. | .................... | 707/10 |
| 6,385,619 B1 | 5/2002 | Eichstaedt et al. | ................ | 707/1 |
| 6,421,675 B1 | 7/2002 | Ryan et al. | ..................... | 707/100 |
| 6,535,888 B1 | 3/2003 | Vijayan et al. | ................ | 707/104 |
| 6,606,619 B2 | 8/2003 | Ortega et al. | ..................... | 707/2 |
| 6,807,574 B1 * | 10/2004 | Partovi et al. | ..................... | 709/224 |
| 6,836,773 B2 * | 12/2004 | Tamayo et al. | ..................... | 707/6 |
| 6,868,525 B1 | 3/2005 | Szabo | .......................... | 715/738 |
| 6,892,198 B2 | 5/2005 | Perisic et al. | ..................... | 707/5 |
| 6,895,406 B2 | 5/2005 | Fables et al. | ................. | 707/102 |

(Continued)

FOREIGN PATENT DOCUMENTS
EP   1050830 A2   11/2000
(Continued)

OTHER PUBLICATIONS

Jeh, G., et al., "Scaling Personalized Web Search," Stanford Univ. Technical Report, 2002.

(Continued)

*Primary Examiner* — Neveen Abel Jalil
*Assistant Examiner* — Kellye Buckingham
(74) *Attorney, Agent, or Firm* — Morgan, Lewis & Bockius LLP

(57) ABSTRACT

In a method of profiling a website, an information server receives multiple search queries from a website submitted by different users. Different search results responsive to the search queries are provided to the requesting users. The information server monitors activities of the users on the search results and generates a profile for the website using the search queries and the user activities. When the information server receives a same search query from two different websites, it identifies a plurality of information items associated with the search query. The information server uses profiles of the two websites to customize the information items into two different orders and serves the information items to the two websites in the two different orders.

24 Claims, 12 Drawing Sheets

U.S. PATENT DOCUMENTS

| | | | |
|---|---|---|---|
| 6,912,505 B2 | 6/2005 | Linden et al. | 705/14 |
| 6,917,938 B2* | 7/2005 | Shea et al. | 1/1 |
| 6,934,748 B1* | 8/2005 | Louviere et al. | 709/224 |
| 6,959,319 B1* | 10/2005 | Huang et al. | 709/203 |
| 7,031,961 B2 | 4/2006 | Pitkow et al. | 707/4 |
| 7,100,111 B2* | 8/2006 | McElfresh et al. | 715/207 |
| 7,207,062 B2* | 4/2007 | Brustoloni | 726/13 |
| 7,240,049 B2* | 7/2007 | Kapur | 707/3 |
| 7,430,561 B2* | 9/2008 | Bailey et al. | 1/1 |
| 7,885,901 B2* | 2/2011 | Hull et al. | 705/319 |
| 2001/0037407 A1* | 11/2001 | Dragulev et al. | 709/250 |
| 2002/0073065 A1 | 6/2002 | Inaba et al. | 707/1 |
| 2002/0091736 A1* | 7/2002 | Wall | 707/513 |
| 2002/0123988 A1 | 9/2002 | Dean et al. | 707/3 |
| 2002/0138331 A1* | 9/2002 | Hosea et al. | 705/10 |
| 2002/0198882 A1 | 12/2002 | Linden et al. | 707/10 |
| 2003/0014399 A1* | 1/2003 | Hansen et al. | 707/3 |
| 2003/0023715 A1* | 1/2003 | Reiner et al. | 709/224 |
| 2003/0149937 A1 | 8/2003 | McElfresh et al. | 715/517 |
| 2004/0034652 A1 | 2/2004 | Hofmann et al. | 707/102 |
| 2004/0044571 A1 | 3/2004 | Bronnimann | 705/14 |
| 2004/0267806 A1 | 12/2004 | Lester | 707/103 |
| 2005/0060389 A1* | 3/2005 | Cherkasova et al. | 709/220 |
| 2005/0071328 A1 | 3/2005 | Lawrence | 707/3 |
| 2005/0071741 A1 | 3/2005 | Acharya et al. | 715/500 |
| 2005/0108406 A1* | 5/2005 | Lee et al. | 709/228 |
| 2005/0144193 A1 | 6/2005 | Henzinger | 707/103 |
| 2005/0222981 A1 | 10/2005 | Lawrence et al. | 707/3 |
| 2005/0240580 A1 | 10/2005 | Zamir et al. | 707/4 |
| 2006/0004711 A1 | 1/2006 | Naam | 707/3 |
| 2006/0026147 A1* | 2/2006 | Cone et al. | 707/3 |
| 2006/0064411 A1 | 3/2006 | Gross et al. | 707/3 |
| 2006/0074883 A1 | 4/2006 | Teevan et al. | 707/3 |
| 2006/0112079 A1* | 5/2006 | Holt et al. | 707/3 |
| 2006/0161553 A1* | 7/2006 | Woo | 707/10 |
| 2007/0067297 A1* | 3/2007 | Kublickis | 707/9 |
| 2007/0088692 A1 | 4/2007 | Dean et al. | 707/5 |
| 2007/0088693 A1 | 4/2007 | Lawrence | 707/5 |
| 2007/0094254 A1 | 4/2007 | Cutts et al. | 707/5 |
| 2007/0094255 A1 | 4/2007 | Acharya et al. | 707/5 |
| 2007/0260597 A1 | 11/2007 | Cramer | 707/5 |

FOREIGN PATENT DOCUMENTS

| | | |
|---|---|---|
| EP | 1 107 128 A1 | 6/2001 |
| WO | WO 03/107127 A2 | 12/2003 |
| WO | WO 2005/001719 A1 | 1/2005 |
| WO | WO 2005/033979 A2 | 4/2005 |
| WO | WO 2005/055015 A2 | 6/2005 |
| WO | WO 2006/014562 A1 | 2/2006 |

OTHER PUBLICATIONS

Pretschner, A., et al., "Ontology Based Personalized Search," Proc. 11th IEEE Int'l Conf. on Tools with Artifical Intelligence, Chicago, Illinois, Nov. 199, pp. 391-398.

International Search Report for International Application No. PCT/US07/065710, mailed Nov. 12, 2007.

Joachims, T., et al., "Accurately Interpreting Clickthrough Data as Implicit Feedback," Proceedings of the 28th Annual Int'l ACM SIGIR Conference on Research and Development in Information Retrieval, Aug. 15, 2005, pp. 154-161.

Juan, Y-F, et al., "An Analysis of Search Engine Switching Behavior Using Click Streams," Internet and Network Economics Lecture Notes in Computer Science, vol. 3828, 2005, pp. 806-815.

Ramachandran, P., "Discovering User Preferences by Using Time Entries in Click-Through Data to Improve Search Engine Results," Discovery Science Lecture Notes in Computer Science, Artificial Intelligence, vol. 3735, 2005, pp. 383-385.

Zhao, M., et al., "Adapting Document Ranking to Users' Preferences Using Click-Through Data," Information Retrieval Technology Lecture Notes in Computer Science, vol. 4182, 2006, pp. 26-42.

"Yahoo! Search Builder-Design Search Box," http://web.archine.org/web/2006813082935/http://builder.search.yahoo.com/m/promo, Aug. 13, 2006, 1 page.

"Guide to Custom Search Engines (CSEs)," http://web.archive.org/web/20061027235927/http://www.customsearchguide.com, Oct. 27, 2006, 1 page.

Brin, S., et al., "The Anatomy of a Large-Scale Hypertextual Web Search Engine," Computer Networks and ISDN Systems, vol. 30, No. 1-7, Apr. 1998, pp. 107-117.

Cho, J., et al., "Efficient Crawling Through URL Ordering," Computer Networks and ISDN Systems, vol. 30, No. 1-7, Apr. 1998, pp. 161-172.

Haveliwala, T.H., "Topic-Sensitive PageRank," Proc. of the 11th Int'l World Wide Web Conf., Honolulu, Hawaii, May 7-11, 2002, 10 pgs.

Ding, J., et al., "Computing Geographical Scopes of Web Resources," Proceedings of the 26th VLDB Conf., Cairo, Egypt 2000, 12 pgs.

Henzinger, M., "Web Information Retrieval—an Algorithmic Perspective," Lecture Notes in Computer Science, Proceedings of the 8th Annual European Symposium, Saarbruken, Germany, Sep. 2000, pp. 1-8.

International Search Report for International Application No. PCT/US2005/025081, mailed Dec. 2, 2005, 4 pgs.

Office Action dated Feb. 18, 2010, for related U.S. Appl. No. 11/846,346.

* cited by examiner

Term-based Website Profile Table 700

| WEBSITE_ID | (TERM_1, WEIGHT_1) | (TERM_2, WEIGHT_2) | . . . | (TERM_N, WEIGHT_N) |
|---|---|---|---|---|
| . | . | . | . | . |
| . | . | . | . | . |
| . | . | . | . | . |

Category-based Document Information Table 1010

| DOC_ID | (CATEGORY_1, WEIGHT_1) | (CATEGORY_2, WEIGHT_2) | . . . | (CATEGORY_X, WEIGHT_X) | Category-based Boost Factor |
|---|---|---|---|---|---|
| | | | | | |
| . . . | . . . | . . . | . . . | . . . | . . . |
| | | | . . . | | |

Term-based Document Information Table 1030

| DOC_ID | (TERM_1, WEIGHT_1) | (TERM_2, WEIGHT_2) | . . . | (TERM_Y, WEIGHT_Y) | Term-based Boost Factor |
|---|---|---|---|---|---|
| | | | | | |
| . . . | . . . | . . . | . . . | . . . | . . . |
| | | | . . . | | |

Link-based Document Information Table 1050

| DOC_ID | (LINK_1, WEIGHT_1) | (LINK_2, WEIGHT_2) | . . . | (LINK_Z, WEIGHT_Z) | Link-based Boost Factor |
|---|---|---|---|---|---|
| | | | | | |
| . . . | . . . | . . . | . . . | . . . | . . . |
| | | | . . . | | |

Figure 10

GENERATING WEBSITE PROFILES BASED ON QUERIES FROM WEBISTES AND USER ACTIVITIES ON THE SEARCH RESULTS

RELATED APPLICATIONS

This application is related to U.S. patent application Ser. No.10/890,854, filed Jul. 13, 2004, entitled "Personalization of Placed Content Ordering in Search Results," which is hereby incorporated by reference.

This application also is related to U.S. patent application Ser. No. 10/869,492, filed Jun. 15, 2004, entitled "Customization of Search Results for Search Queries Received from Third Party Sites," which is hereby incorporated by reference.

FIELD OF THE INVENTION

The present invention relates generally to the field of a search engine in a computer network system, in particular to system and method of generating a profile for a website and using the profile to customize rankings of search results in response to search queries submitted from the website.

BACKGROUND OF THE INVENTION

Search engines are a powerful tool of locating and retrieving documents from the Internet (or an intranet). Many websites include at least one search box on their webpages. The search box on a particular webpage typically enables users to submit search queries to search for documents at the website associated with the webpage, or to search for document on the Internet. However, most websites do not have an exclusive, dedicated search engine system for processing these search queries. This is especially true if the search box enables searches of the entire Internet for relevant documents. Rather, the search queries are re-directed to and processed by a third-party search engine (e.g., www.google.com). The third-party search engine generates search results responsive to the search queries (e.g., by searching a database of documents) and returns the search results to the requesting users.

Traditionally, the search results produced by the third-party search engine are independent of the website from which a search query is submitted. For example, the search engine generates the same search result for the search query "apple" irrespective of whether the search query is from the website of an online retail electronics store frequented by Apple computer users or an online shopping website hosted by a grocery store. Clearly visitors to these two websites have different interests and should receive different search results. As a result, the search results returned for the search query "apple" are likely to include results of little interest to visitors to these respective websites.

A similar issue could arise for a website that includes multiple search boxes associated with different webpages. For instance, a sports news website may have one webpage covering domestic news and another one devoted to international news. A user entering the term "football" into the search box on the domestic news webpage is probably interested in news related to American football, while a user entering the same term "football" into the search box on the international news webpage is probably more interested in news about soccer (which is known as "football" outside the United States). Similar issues may arise if a sports news website has different webpages covering news for different sports, and search boxes in each of these pages. Thus, when a search engine ignores the webpages from which a search query is submitted, users do not receive search results best tailored to their distinct interests.

In view of the aforementioned, it would be desirable to have a search engine that can customize its search results in accordance with the websites (or webpages) from which the corresponding search queries are submitted so as to highlight information items in the search results that are most likely to be of interest to the users who submit the search queries. Further, it would be desirable for such a system to operate without explicit input from a user with regard to the user's personal preferences and interests and therefore free the user from concerns over exposing private information.

SUMMARY

In a method of profiling a website, an information server receives multiple search queries from a website submitted by different users. Different search results responsive to the search queries are provided to the requesting users. The information server monitors activities of the users on the search results and generates a profile for the website using the search queries and the user activities.

In a method of providing website-dependent search results, an information server receives a same query from two websites and identifies a plurality of information items associated with the search query. The information server uses profiles of the two websites to customize the information items into two different orders and serves the information items to the two websites in the two different orders. The two website profiles are related to the search histories of the two websites.

The present invention, including website profile construction and search results re-ordering and/or scoring, can be implemented on either the client side or the server side of a client-server network environment.

BRIEF DESCRIPTION OF THE DRAWINGS

The aforementioned features and advantages of the invention as well as additional features and advantages thereof will be more clearly understood hereinafter as a result of a detailed description of preferred embodiments of the invention when taken in conjunction with the drawings.

FIG. 10 is a block diagram of exemplary data structures that may be used for storing category-based, term-based, and link-based boost factors for documents in the search results in accordance with some embodiments of the present invention.

Like reference numerals refer to corresponding parts throughout the several views of the drawings.

DESCRIPTION OF EMBODIMENTS

For illustrative purposes, the embodiments discussed below only include systems and methods that generate a website profile based on the search history associated with the website and then use the website profile to rank search results in response to search queries submitted from the website. However, it will be apparent to one skilled in the art will that the underlying principles discussed below can be easily extended to create webpage profiles and generate webpage-dependent search results using the webpage profiles.

Figure 1:
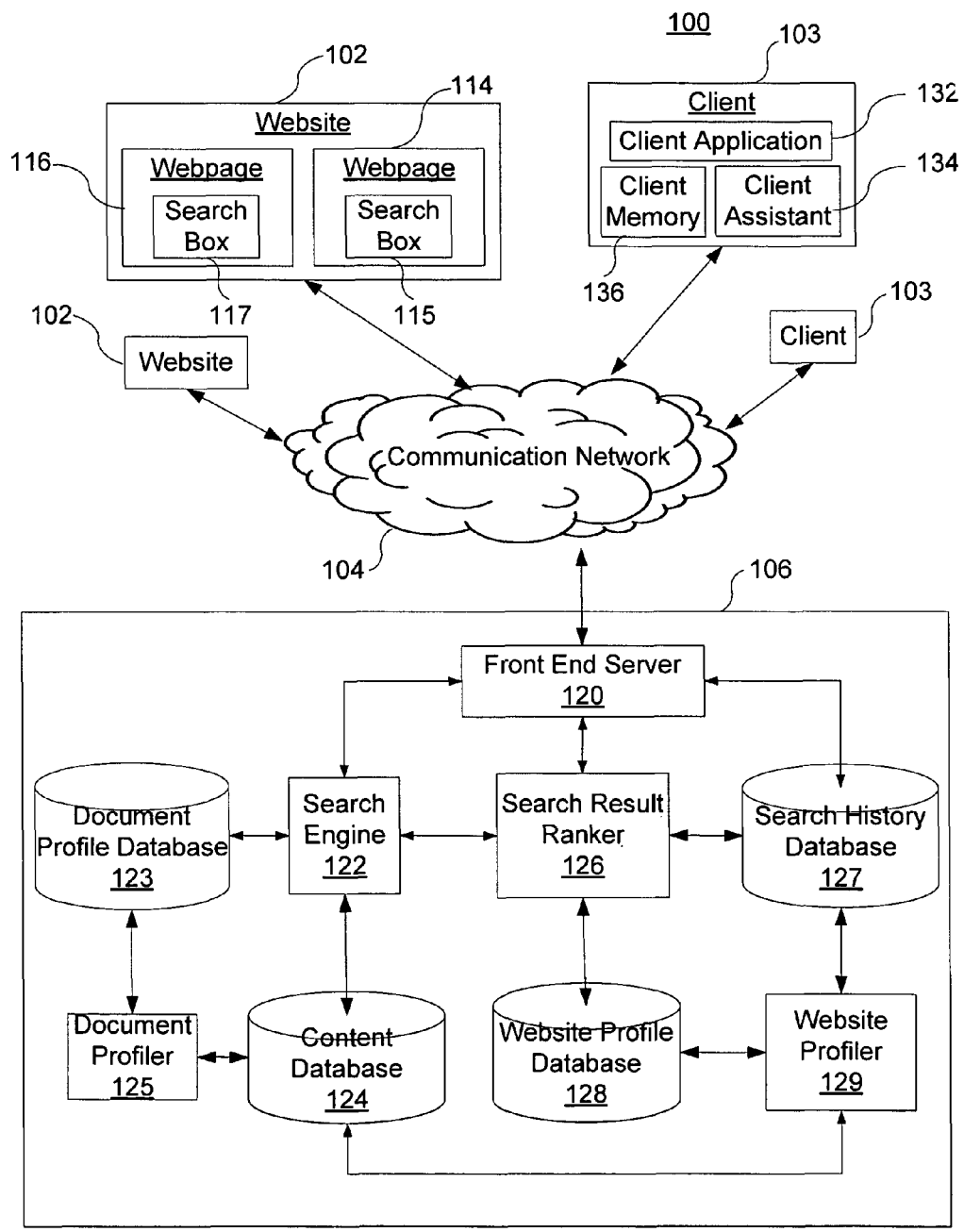
FIG. 1 is a block diagram of an exemplary distributed system that includes a plurality of websites and clients requesting information from an information server in accordance with some embodiments of the present invention.

FIG. 1 is a block diagram of an exemplary environment 100 for implementing some embodiments of the present invention. One or more websites 102 and clients 103 can be connected to a communication network 104. The communication network 104 can be connected to an information server 106. The information server 106 may include a front end server 120, a search engine 122, a document profiler 125, a website profiler 129, a search result ranker 126, a document profile database 123, a content database 124, a search history database 127, and a website profile database 128.

In some embodiments, the information server 106 contains a subset or superset of the elements illustrated in FIG. 1. Although FIG. 1 shows the information server 106 as a number of discrete items, the figure is intended more as a functional description of the various features which may be present in the information server 106 rather than a structural schematic of the various embodiments. In practice, items shown separately could be combined and some items could be further separated, as would be recognized by one of ordinary skill in the art of designing such systems. For example, the four different databases 123, 124, 127, and 128 shown separately in the figure could be implemented by a single database server. The actual number of computers constituting the information server 106 and the allocation of features among the computers will vary from one implementation to another, and may depend in part on the amount of traffic that the information server 106 must handle during peak usage periods as well as during average usage periods.

A website 102 is typically a collection of webpages associated with a domain name on the Internet. Each website (or webpage) has a universal resource locator (URL) that uniquely identifies the location of the website (or webpage) on the Internet. Any visitor can visit the website by entering its URL in a browser window. A website can be hosted by a web server exclusively owned by the owner of the domain name or by an Internet service provider wherein its web server manages multiple websites associated with different domain names. For illustrative purposes, the website 102 includes two webpages 114 and 116, each having an associated search box 115 and 117, respectively. From the search box 115 (or 117), a visitor to the webpage 114 (or 116) can search the website 102 or the entire Internet for relevant information by entering a search query into the search box. Depending on the context, the term "website" as used in this document refers to a logical location (e.g., an Internet or intranet location) identified by a URL, or it refers to a web server hosting the website represented by the URL, or both.

A client 103 can be any of a number of devices (e.g., a computer, an internet kiosk, a personal digital assistant, a cell phone, a gaming device, a desktop computer, or a laptop computer) and can include a client application 132, a client assistant 134, and/or client memory 136. The client application 132 can be a software application that permits a user to interact with the client 103 and/or network resources to perform one or more tasks. For example, the client application 132 can be a browser (e.g., Firefox) or other type of application that permits a user to search for, browse, and/or use resources (e.g., webpages and web services) at the website 102 from the client 103 and/or accessible via the communication network 104. The client assistant 134 can be a software application that performs one or more tasks related to monitoring or assisting a user's activities with respect to the client application 132 and/or other applications. For instance, the client assistant 134 assists a user at the client 103 with browsing for resources (e.g., files) hosted by the website 102; processes information (e.g., search results) received from the information server 106; and monitors the user's activities on the search results. In some embodiments the client assistant 134 is part of the client application 132, available as a plug-in or extension to the client application 132 (provided, for example, from various online sources), while in other embodiments the client application is a stand-alone program separate from the client application 132. In some embodiments the client assistant 134 is embedded in one or more webpages or other documents downloaded from one or more servers, such as the information server 106. Client memory 136 can store information such as webpages, documents received from the information server 106, system information, and/or information about a user, among other things.

The communication network 104 can be any wired or wireless local area network (LAN) and/or wide area network (WAN), such as an intranet, an extranet, or the Internet. It is sufficient that the communication network 104 provide communication capability between the websites 102, the clients 103 and the information server 106. In some embodiments, the communication network 104 uses the HyperText Transport Protocol (HTTP) to transport information using the Transmission Control Protocol/Internet Protocol (TCP/IP). The HTTP permits client computers to access various resources available via the communication network 104. The various embodiments of the invention, however, are not limited to the use of any particular protocol. The term "resource" as used throughout this specification refers to any piece of information or service that is accessible via a URL and can be, for example, a webpage, a document, a database, an image, a computational object, a search engine, or other online information service.

In order to receive website-dependent search results, a user from a client 103 first sends to a website 102 a request for a webpage. The website responds by identifying the requested webpage and returns it to the requesting client 103. The webpage may include a document of interest to the user (e.g., a newspaper article). The webpage may also include a search box (e.g., at or near the top of the webpage). While or after browsing the content of the webpage, the user may be interested in getting more information. To do so, the user can enter a search query into the search box and submit the search query to the website 102. The search query may include one or more query terms.

As noted above, many websites do not have a dedicated search engine. Their search requests are actually handled by a third-party search engine. In some embodiments, upon receipt of the search query, the website 102 generates and sends a search request to the information server 106. In some other embodiments, the client 103 generates and sends the search request directly to the information server 106 without routing the request through the website 102. In either case, the search request includes the search query and unique identifiers of the requesting website 102 and the requesting client 103.

Within the information server 106, the front end server 120 is configured to handle a variety of requests from the websites 102 and the clients 103 via their respective connections with the communication network 104. As shown in FIG. 1, the front end server 120 is connected to the search engine 122 and the search engine 122 is connected to the content database 124, respectively. The content database 124 stores a large number of indexed documents retrieved from different websites. Alternately, or in addition, the content database 124 stores an index of documents stored at various websites. In one embodiment, each indexed document is assigned a page rank according to the document's link structure. The page rank serves as a query-independent measure of the document's importance.

The front end server 120 passes the search request onto the search engine 122. The search engine 122 then communicates with the content database 124 to select a plurality of documents in response to the search request. The search engine 122 assigns a generic ranking score to each document based on the document's page rank, the text associated with the document, and the search query.

The search engine 122 is also connected to the document profile database 123. The document profile database 123 stores a document profile for each indexed document in the content database 124. Both the document profile database 123 and the content database 124 are connected to the document profiler 125. For each document in the content database 124, the document profiler generates a document profile by analyzing the content of the document and its link structure. The generation of document profiles is independent of the operation of the search engine 122. In one embodiment, the document profiler 125 is invoked to generate a document profile whenever the information server 106 identifies a new document or a new version of an existing document on the Internet. In another embodiment, the document profiler 125 is invoked periodically to generate document profiles for all new files identified during a predetermined time period. In some embodiments, instead of being two separate entities, the document profile database 123 and the content database 124 are merged together so that a document and its associated profile can be located by a single database query.

There is a connection from the search engine 122 to the search result ranker 126. Through this connection, the search engine 122 sends the identified documents and their associated document profiles to the search result ranker 126. The search result ranker 126 has a connection to the website profile database 128. Like the document profile database 123, the website profile database 128 stores a large number of website profiles including the profile of the requesting website 102. Using the requesting website 102's profile, the search result ranker 126 converts the generic ranking score of each identified document into a website-dependent ranking score. The documents are then re-ordered in accordance with their respective website-dependent ranking scores. Next, the search result ranker 126 creates a search result in accordance with the updated order of the documents, the search result including multiple document links, one for each document. The search result, or a portion of the search result (e.g., information identifying the top 10, 15 or 20 results) is returned to the requesting client 103 and displayed to the user through the client application 132. The user, after browsing the search result, may click one or more document links in the search result to download and view one or more documents identified by the search result.

While the above description divided tasks among the search engine 122, search result ranker 126 and front end server 120 in a particular way, this particular division of tasks is exemplary, and other divisions may be used in other embodiments of the present invention. For instance, the website profile (of the website from which a search query is received) may be transmitted with the search query to the search engine 122, and the search engine 122 may use that information to compute website specific document scores for ranking the search results. In effect, this would merge the search result ranker 126 into the search engine 122. In yet other embodiments, other divisions of tasks may be used.

An important aspect of the process of serving website-dependent search results is the generation and maintenance of the website profiles stored in the website profile database 128. A website profile should reflect the interests of the users of the associated website, and in many embodiments the website profile will be unique to its associated website. For example, a consumer electronics website should have a website profile that boosts webpages related to electronic products while an on-line grocery store website should have a website profile that promotes webpages related to farm produces.

In most embodiments, a website profile is not static, because a static website profile is unlikely to result in the information server 106 serving the most relevant search results to users of the associated website. Instead, a website profile is updated from time to time, (e.g., periodically) so as to re-align the website profile with the current interest of the users of the website. While some website profiles may remain virtually static for long periods of time (e.g., websites serving a small, static population of users who submit searches from the website on only a very narrow range of topics), many website profiles will vary over time as the users of the website changes and as the interests of the website's users varies over time.

There are similarities between a website profile and a user profile. Both profiles can be used to finely tune the search results generated by the search engine. Both need information about at least one user's search history in order to capture the user's dynamic search interest. But there are also significant differences between the two types of profiles. A typical user profile is generated by analyzing an individual user's search history. This user profile is only used to modulate search results responsive to search queries submitted by the same user. For the same search query, two different users may receive different search results from the same search engine if they have different user profiles. In contrast, a website profile is generated by analyzing the search history of multiple users while visiting the website so as to characterize the multiple users' interests. This website profile can be used to modulate search results responsive to search queries submitted by any user from the same website, including new users of the website who made no prior "contribution" to the website profile. Therefore, the same user submitting the same search query from two different websites may receive different search results if the two websites have different website profiles.

The website profile also has an important advantage over the user profile in terms of protecting a user's privacy. A user profile is associated with an individual user. To create the user profile, the individual user, either explicitly or implicitly (e.g., by monitoring or logging search queries and other online activities of the user), needs to complete a survey of his or her personal preferences. This survey indicates what information items may be of interest to the user. Further, the user must have an account at a website or a search engine system and the user must log into his or her account to invoke the user profile to personalize the search results. In contrast, the creation and usage of the website profile does not require any personal information from any user. A website profile is associated with a website, not an individual user. Any individual user's activity at the website is attributed to all the users of the website. A user does not need to log into his or her account at the website in order to use the website profile. As long as a search query is submitted from the website, the information server automatically "personalizes" the corresponding search result in accordance with the website profile.

As shown in FIG. 1, the website profiler 129 is responsible for generating and updating website profiles. In order to capture the current user interest associated with a particular website, the website profiler 129 needs to have access to the users search history at the website. The users search history includes the search queries submitted by users while visiting the website, the search results responsive to the search queries, and the user activities on the search results (e.g., selection of a document link, sometimes called "clicking" on a search result, or mouse hovering time over a document link).

For example, when the front end server 120 receives a search query from a website, it submits a copy of the search query to the search engine 122 to solicit a search result. In addition, the front end server 120 sends another copy of the search query to the search history database 127. The search history database 127 then generates a record, the record including at least the search query and an identifier of the website from which the search query was received.

The search result ranker 126 prepares a search result responsive to the search query. The search result (i.e., information representing at least a portion of the search result) is sent back to the requesting client through the front end server 120. A copy of the search result, or a portion of the search result, is also stored in the search history database 127 together with the search query record. The client assistant 134 at the requesting client monitors the requesting user's activities on the search result, e.g., recording the user's selection(s) of the document links in the search result and/or the mouse hovering time on different document links. In some embodiments, the client assistant 134 or the website profiler 129 determines the document "dwell time" for a document selected by the user, by determining the amount of time between user selection of the corresponding document link and the user exiting from the document. In some embodiments, the client assistant 134 includes executable instructions, stored in the webpage(s) containing the search result, which monitor the user's actions with respect to the search results and transmit information about the monitored user actions back to the information server 106. The information server 106, in turn, stores information about these user activities is transferred back to the information server 106 and stored in the search history database 127 for subsequent use.

For example, the website profiler 129 records the moment that a user submits a search query (t0), the moment that the user clicks the first document link in the corresponding search result (t1), and the moment that the user clicks the second document link in the search result (t2), etc. The differences between two consecutive moments (e.g., t1–t0 or t2–t1) are reasonable approximations of the amount of time spent viewing the search result or the document whose link was selected by the user. In some embodiments the website profiler 129 has no information about the user's dwell time for the last document in the search result that the user selects for viewing. In some other embodiments (e.g., where at least some users "opt in" to a version of the client assistant that collects additional information about the users' online activities), the website profiler 129 also receives click and timestamp information for user actions after the user finishes viewing documents from a search result. Continuing the above example, the website profiler 129 further records the moment that the user submits a second query (t3), the moment the user selects a document from the second search results (t4), and so on. Furthermore, the website profiler 129 may record the moment (t5) when the user either closes the browser window that was being used to view search results and documents listed in the search results or navigates away from the website from which the query was received. This additional information enables the website profiler 129 to determine the user dwell time for all search result documents (i.e., documents listed in search results) viewed by a user, which in turn enables the website profiler 129 to generate a more accurate website profile for a website.

Figure 2:
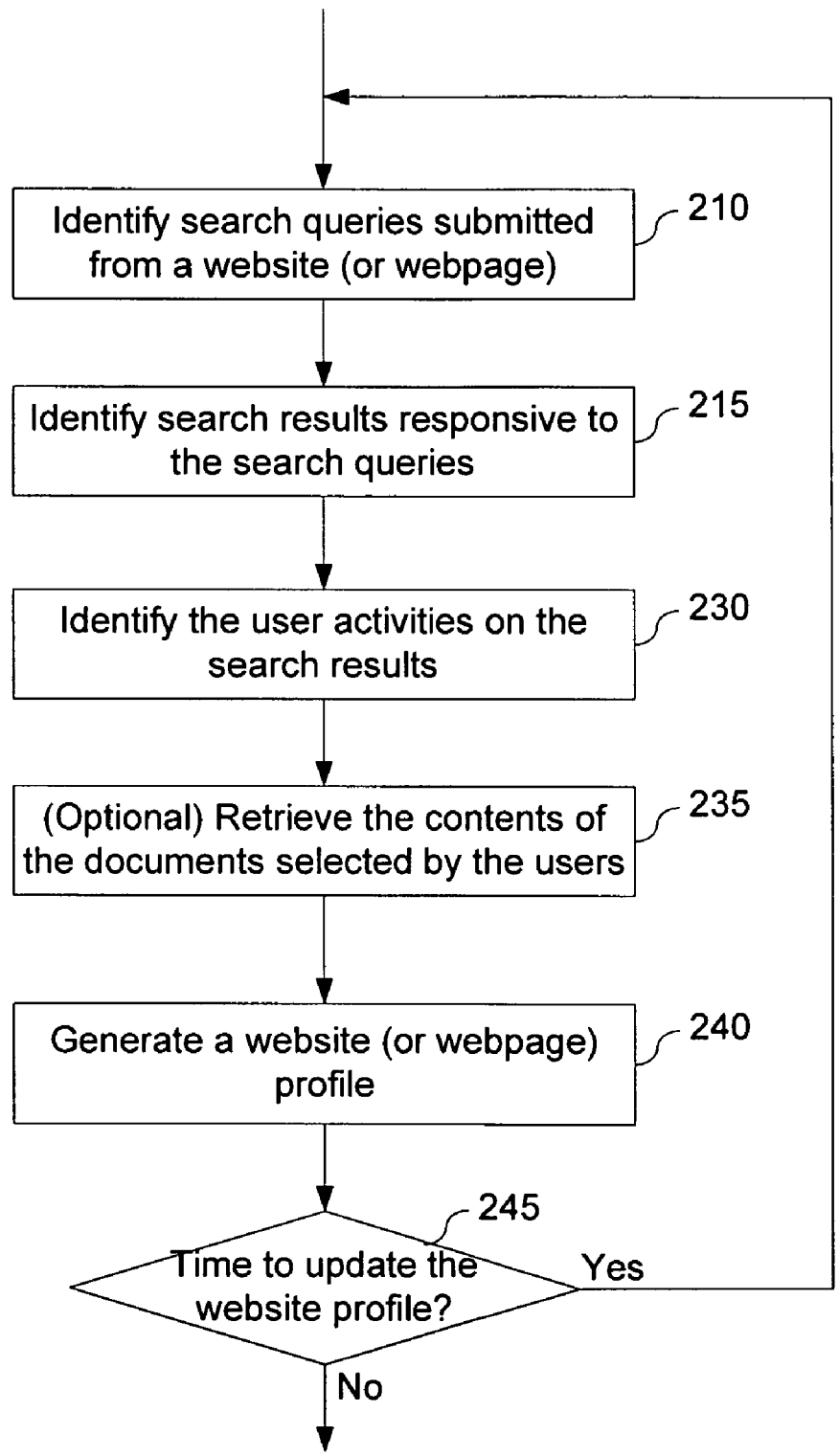
FIG. 2 is a flow diagram of a process for generating a website (or webpage) profile using search queries, search results and user activities associated with the website (or webpage) in accordance with some embodiments of the present invention.

Based on a website's search history information, the website profiler 129 generates a website profile. FIG. 2 is a flow diagram of a process for generating a website profile using the website's search history in accordance with some embodiments of the present invention. Initially, the website profiler 129 identifies search queries submitted from the website (210). While in most cases, this will include all search queries submitted from the website, in the case of very popular or busy websites, the identified search queries may comprise a subset or sampling of the submitted search queries. Search queries submitted from a website during a predetermined time period presumably represent the general interest of users using the website. The search queries are especially relevant to capture dynamic user interests that vary by time. In connection with the search queries, the website profiler 129 identifies the corresponding search results (215). In some embodiments, the search results are served to the requesting users with an embedded client assistant 134 that sends information about the user activities on the search results to the website profiler 127. Using the information sent by the client assistants, the website profiler identifies user activities on the search results (230). Identified user activities may include user clicks on document links in search results. In another example, identified user activities may include mouse hovering time on the document links. Generally speaking, a user clicks a document link if the user is interested in the document's content. Similarly, the fact that the mouse moves onto a particular document link and stays there for a substantial amount of time indicates that this document is relevant to the user's interest. In some embodiments, information about the mouse hovering time may be unavailable.

From the user activities on different search results, the website profiler 129 can identify documents selected by the website users. In some embodiments, the website profiler 129 visits the content database 124 to retrieve the profiles of the corresponding documents (235). As noted above, each identified document may have a profile (e.g., a category profile) that was previously generated. If any of the identified documents do not yet have profiles, those documents can be ignored, or the website profiler may call upon the document profiler 125 to produce document profiles for those documents. A website profile is then generated from the retrieved document profiles (240). The website profile may include one or more of the following: a weighted listing or vector of categories (sometimes called a category-profile), key terms from the search queries and/or user visited documents (sometimes called a term profile), and information about the links to the user visited documents (sometimes called a link profile). This website profile is stored in the website profile database 128. The search result ranker 126 can retrieve the website profile to re-order the ranks of the documents within a search result.

In some other embodiments, operations 235 and 240 are replaced by a clustering operation in which user selected documents are clustered purely based on the fact that the same user clicks their associated links. Alternatively, the website profiler directly matches a document's URL against a known set of URLs associated with a particular category. In either case, the website profiler 129 does not need to access the documents' contents in order to generate the website profile.

In yet other embodiments, operations 230 through 240 are replaced by a process that maps the queries submitted from a website to a set of categories. The categorization of queries can be based on the terms in the queries themselves, or by accessing the profiles of the top N search results (e.g., the top 5, 10, 15 or 20 search results), merging those document profiles to produce a query profile for each query, and merging the query profiles, weighted in accordance with their frequency of submission by the users of the website's search box(es) to generate a website profile. As discussed below with reference to FIG. 4, this process may exclude queries that are deemed to be unlikely to be related to the primary interests of the website's users.

As noted above, a website profile is updated from time to time in order to keep track of the current interests of the users visiting the website (245). In some embodiments, a website profile is updated at a predetermined time interval (e.g., every week or every day). In some other embodiments, a website profile is updated whenever the number of new search queries at the website reaches a threshold value since a last (i.e., most recent) update. Whenever it is time to update the website profile, the website profiler 129 repeats the aforementioned process to update the website profile.

In some embodiments, different websites attract substantially different magnitudes of traffic and therefore should be treated differently in terms of profile updating. For instance, a popular website may receive tens of thousands of hits per day while a less popular website may have a much lower hit rate. The search history database 126 may allocate amounts of storage space for different websites. As a result, the volume of search history associated with the popular website does not exhaust its designated space and the less popular website does not waste too much space before their next scheduled profile updating.

Some websites are so popular that it is impractical to store in the search history database 127 all the search history for the purpose of profile updating. For example, an on-line bookstore may have a significantly large number of visitors when a new bestseller is released. There are two issues with a website having a significant traffic during a short time period. First, the website's profile may be biased by this traffic peak. Special care may be required to make sure that the website profile has an appropriate balance between the short-term and long-term interests of the website users. Second, the search history database 127 may not have the space to store all the search history. One approach to solve this issue is to intentionally ignore some of the search queries, search results and user activities. This may be accomplished by sampling the search queries, search results and/or user activities so as to produce an unbiased sample of the search history. While the extent of the sampling may vary from one embodiment to another, experiments suggest that a search history encompassing several months of user activities will have sufficient data to generate a reliable website profile, for most websites, so long as (A) the sampling is done in a manner that avoids significant biases, and (B) it includes user activity data corresponding to a few weeks of representative search history.

Figure 3:
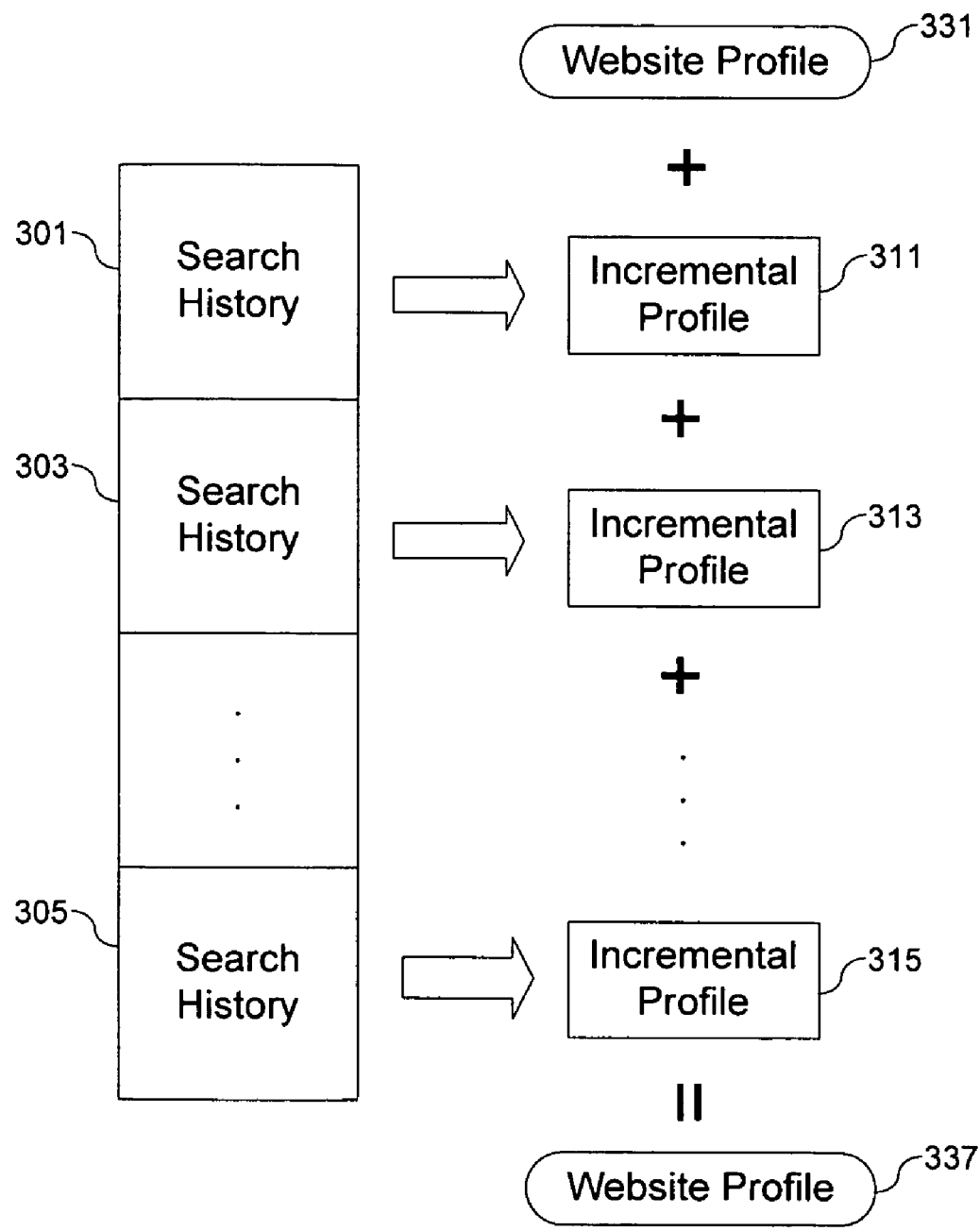
FIG. 3 is a block diagram of a process for updating a website (or webpage) profile by merging an incremental website (or webpage) profile into the website (or webpage) profile in accordance with some embodiments of the present invention.

Alternatively, the space shortage issue can be solved by generating a series of incremental website profiles for different portions of the search history and merging the incremental website profiles into the website profile. As shown in FIG. 3, the website profiler 129 first generates an incremental profile 311 for the search history section 301. Each search history section 301, 303, 305 may include a predefined quantity of search history information, or it may include search history information for a predefined length of time (e.g., an hour), or it may a portion of the search history selected in accordance with predefined selection criteria. The process of generating an incremental website profile is similar to the process discussed above in connection with FIG. 2. The incremental profile 311 is equivalent to the search history section 301 in terms of characterizing the interests of the website users. Once the incremental profile 311 has been created, the corresponding search history section 301 in the database can be overwritten by new entries entering the database. Similarly, the search history section 303 can be overwritten after the incremental profile 313 is generated. After the creation of the incremental profile 315, the website profiler 129 can create the new website profile 337 by merging the incremental profiles 311, 313, and 315 into the old website profile 331. In sum, the website profiler 129 is able to take into account the entire search history by creating incremental website profiles for search history sections 301, 303, and 305 and by merging an existing website profile with incremental profiles 311, 313, and 315.

A website profile is used for "personalizing" or "flavoring" search results responsive to search queries submitted from a specific website. An underlying assumption in the present specification is that these search queries are, more or less, related to the topics covered by the website. For example, to a golfing website, the search query "Tiger Woods" is reasonably relevant while the search query "Britney Spears" is probably irrelevant at all. But it is quite possible for a user to enter a very popular term like "Britney Spears" into the search box on the golfing website. This is especially true if the search box can be used to search the entire Internet. If not carefully filtered out, the search history associated with these popular, but irrelevant, terms may seriously "contaminate" the website profile and twist the search results in an unexpected direction. Another source of contamination of the website profile is query terms that, although relevant, have very low popularity. Special treatment may be necessary to make sure that user activities with respect to very low popularity query terms do not significantly bias the search results.

Figure 4:
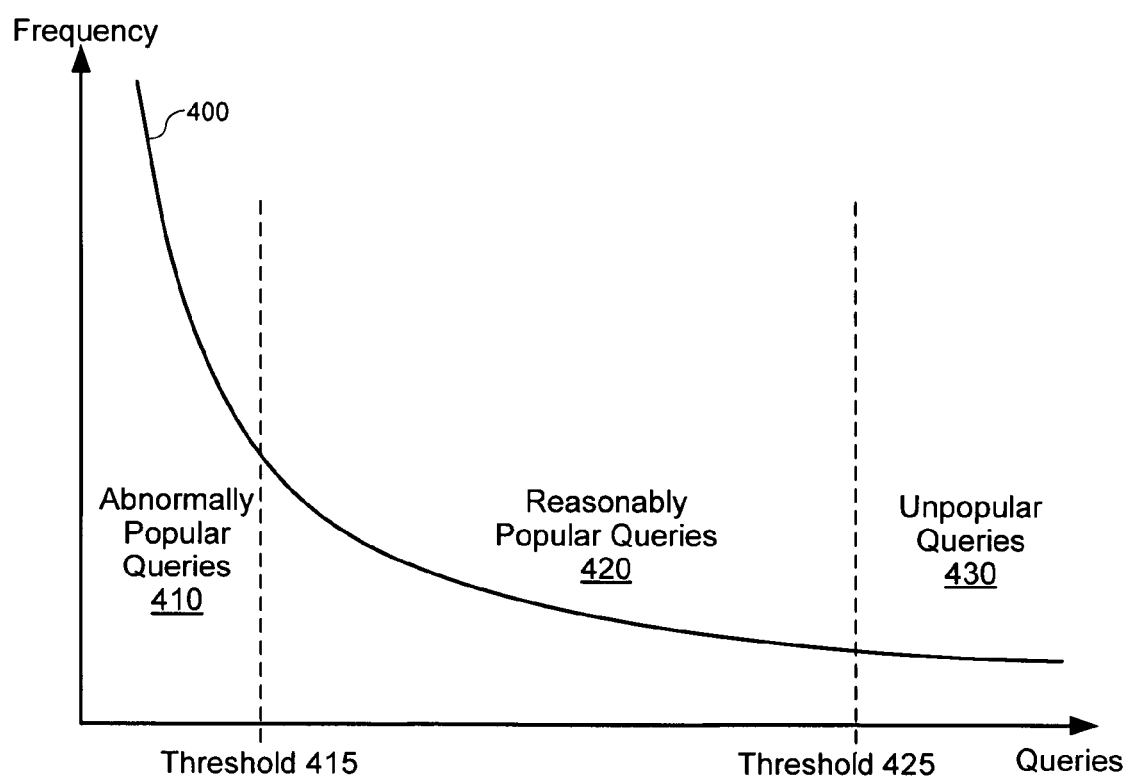
FIG. 4 is a prophetic example of a curve characterizing the popularity distribution of search queries submitted from a website (or webpage).

FIG. 4 is an exemplary curve 400 characterizing the popularity distribution of search queries submitted from a website. All the search queries are divided into three categories by the two thresholds 415 and 425. The leftmost category 410 includes those search queries that are "abnormally" popular, but less relevant, to the website. The search query "Britney Spears" being submitted by a golfing website's search window is an example of a search query in this category. The website profiler 129 should eliminate or at least reduce the influence of the search history associated with these queries on the website profile by giving them relatively low weights. The middle category 420 includes those search queries that are reasonably popular and relevant to the website. The search history corresponding to these search queries should be granted higher weights to make a major contribution to the website profile. Finally, the rightmost category 430 includes those queries that only appear in the website's search box occasionally. They should be treated in a manner similar to the queries in the leftmost category 410.

There are multiple factors determining the contribution of a search query (or a corresponding search result) in the middle category 420 to the website profile. For example, the popularity of the search query and the amount of user activities on the search result affect the contribution of the search query and the search result on the website profile. Time is another important factor. In some embodiments, recent search history plays a more prominent role than less recent search history in the formation of the website profile. One skilled in the art can easily apply similar principles to other aspects of the search history associated with the website.

Figure 5:
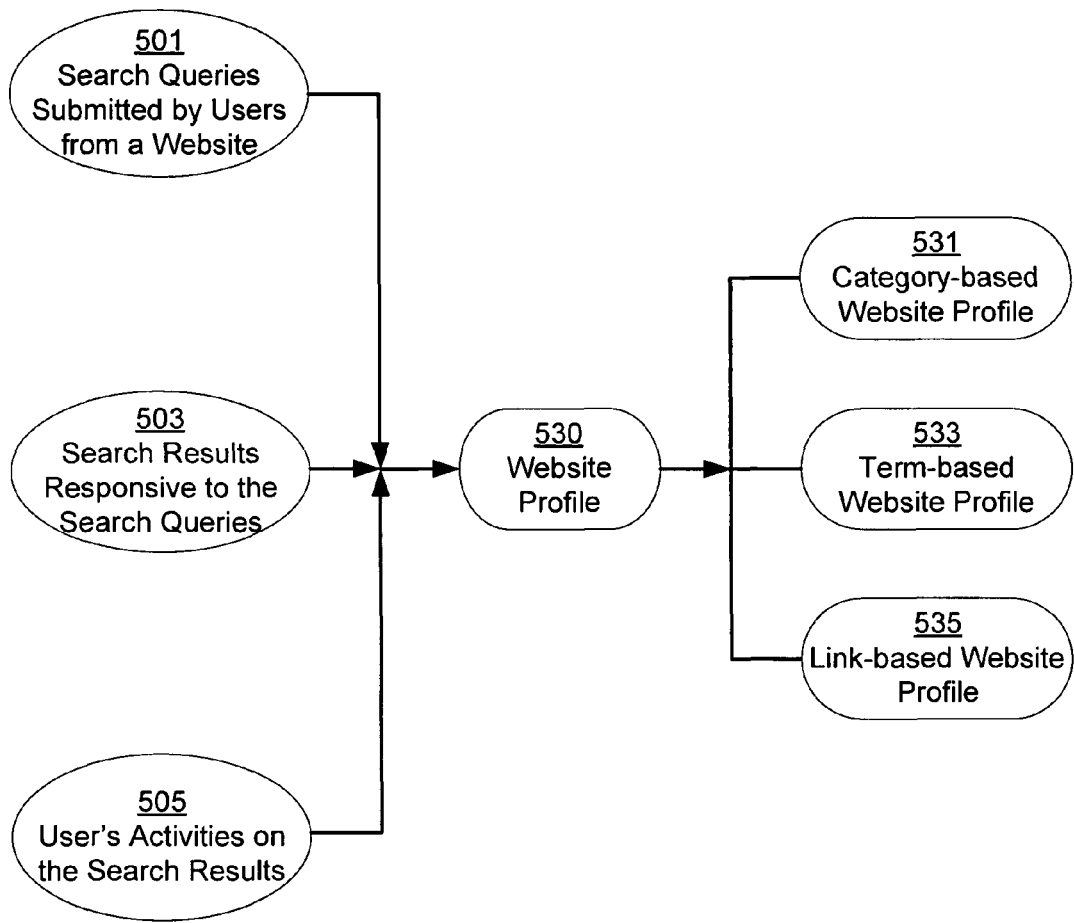
FIG. 5 is a block diagram illustrating how the process of creating a website profile is divided into multiple sub-processes in accordance with some embodiments of the present invention.

FIG. 5 is a block diagram illustrating how the process of creating a website profile is divided into multiple sub-processes in accordance with some embodiments of the present invention. As noted above, it is a non-trivial process to create a profile 530 for a website using its search history. The search history involves different types of information from different sources, such as the search queries 501 submitted by users from the website, the search results 503 generated by the search engine in response to the search queries, and the user activities 505 on the search results. In some embodiments, this process is further divided into multiple sub-processes. Each sub-process produces a specific type of website profile characterizing the interests of the website users from a particular perspective. They are:

- category-based profile 531—this profile correlates the search history with a set of predefined categories, which may be organized in a hierarchal fashion, with each category being given a weight indicating the relevance of the category to the interests of the website users;
- a term-based profile 533—this profile abstracts the search history with a plurality of terms, wherein each term is given a weight indicating the relevance of the term to the interests of the website users; and
- a link-based profile 535—this profile identifies a plurality of links that are directly or indirectly related to the search history, with each link being given a weight indicating the relevance of the link to the interests of the website users.

In some embodiments, the website profile 530 includes only a subset of the profiles 531, 533, 535. For example, the website profile 530 may include the term-based profile 533 and the category-based profile 531, but not the link-based profile 535. In some embodiments, the website profile 530 includes a plurality of profiles, at least one of which is a combination of two or more of the aforementioned profiles 531, 533, 535. In some other embodiments, the category-based, term-based and/or link-based profiles are further processed to generate a refined category-based (or cluster-based) profile. In yet some other embodiments, this refined category-based (or cluster-based) profile appears in the form of multiple category-based (or cluster-based) sub-profiles to characterize different aspects of the website.

The category-based profile 531 may be constructed, for instance, by mapping search history items (e.g., search queries, content terms, and/or user-selected documents) to categories, and then aggregating the resulting sets of the categories and weighting the categories. The categories may be weighted based on their frequency of occurrence in the search history items. In addition, the categories may be weighted based on the relevance of the search history items to the categories. The search history items accumulated over a period of time may be treated as a group for mapping into weighted categories. Other suitable ways of mapping the search history into weighted categories may also be used.

Figure 6A:
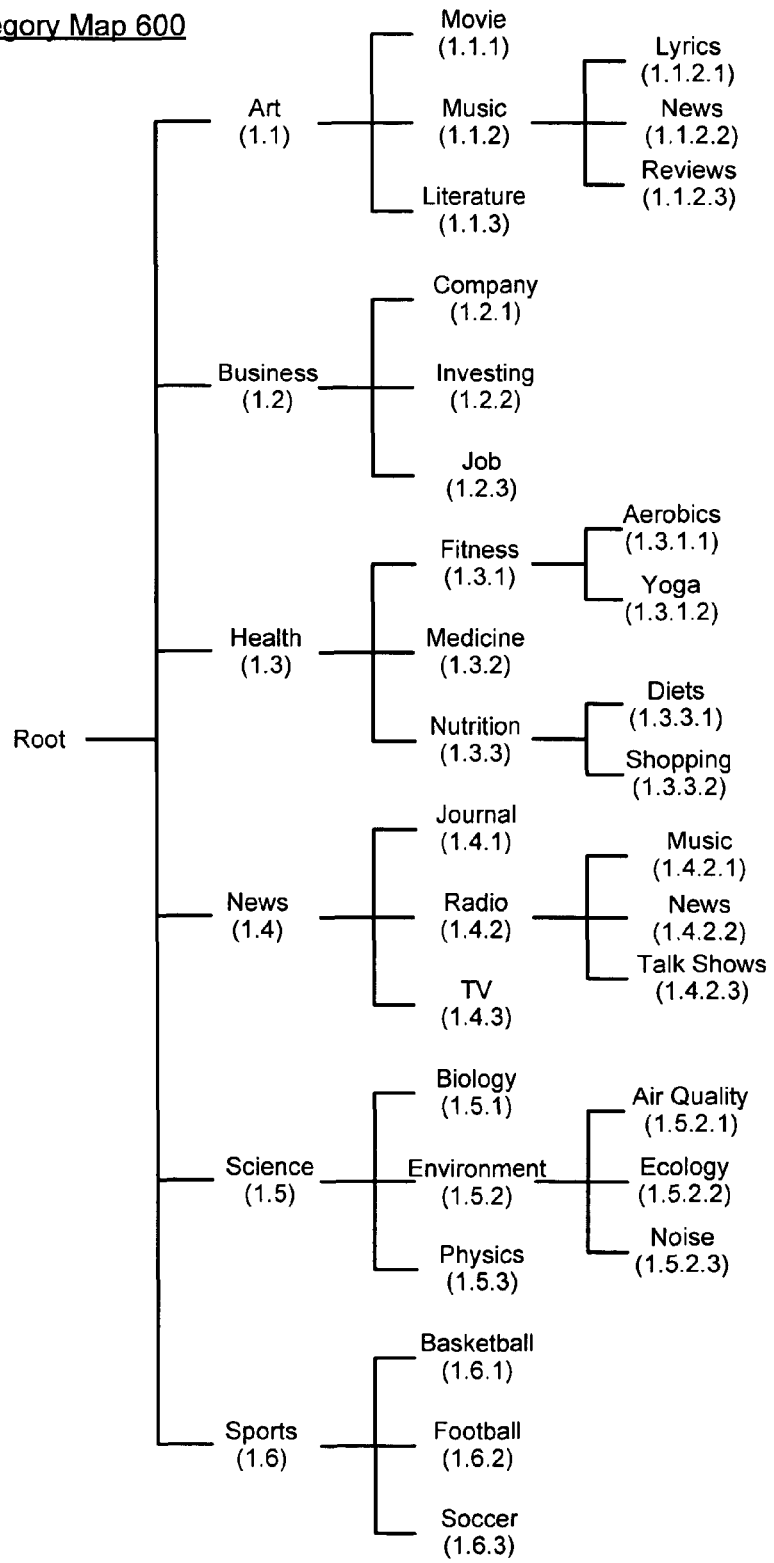
FIG. 6A is a block diagram of an exemplary category map that may be used for generating category-based website profiles in accordance with some embodiments of the present invention.

FIG. 6A illustrates a hierarchal category map 600 according to the Open Directory Project (http://dmoz.org/). Starting from the root level of map 600, documents are organized under several major topics, such as "Art", "News", "Sports", etc. These major topics are often too broad to delineate the specific interest of a website user. They are further divided into multiple more specific sub-topics. For example, the topic "Art" may comprise the sub-topics like "Movie", "Music", and "Literature" and the sub-topic "Music" may further comprise sub-sub-topics like "Lyrics", "News", and "Reviews." Note that each topic (or sub-topic) is associated with a unique category identifier like 1.1 for "Art", 1.4.2.3 for "Talk Show", and 1.6.1 for "Basketball."

The categories shown in FIG. 6A are only for illustrative purposes. One skilled in the art will appreciate that there are many other ways of categorizing documents. For example, different concepts can be extracted from the contents of the documents and different categories of relevant information are grouped in accordance with these concepts. The interests of users of a particular website may be associated with multiple categories at different levels, each having a weight indicative of the category's relevance to the users' interest. The categories and their associated weights can be determined from analyzing the search history associated with the website.

Figure 6B:
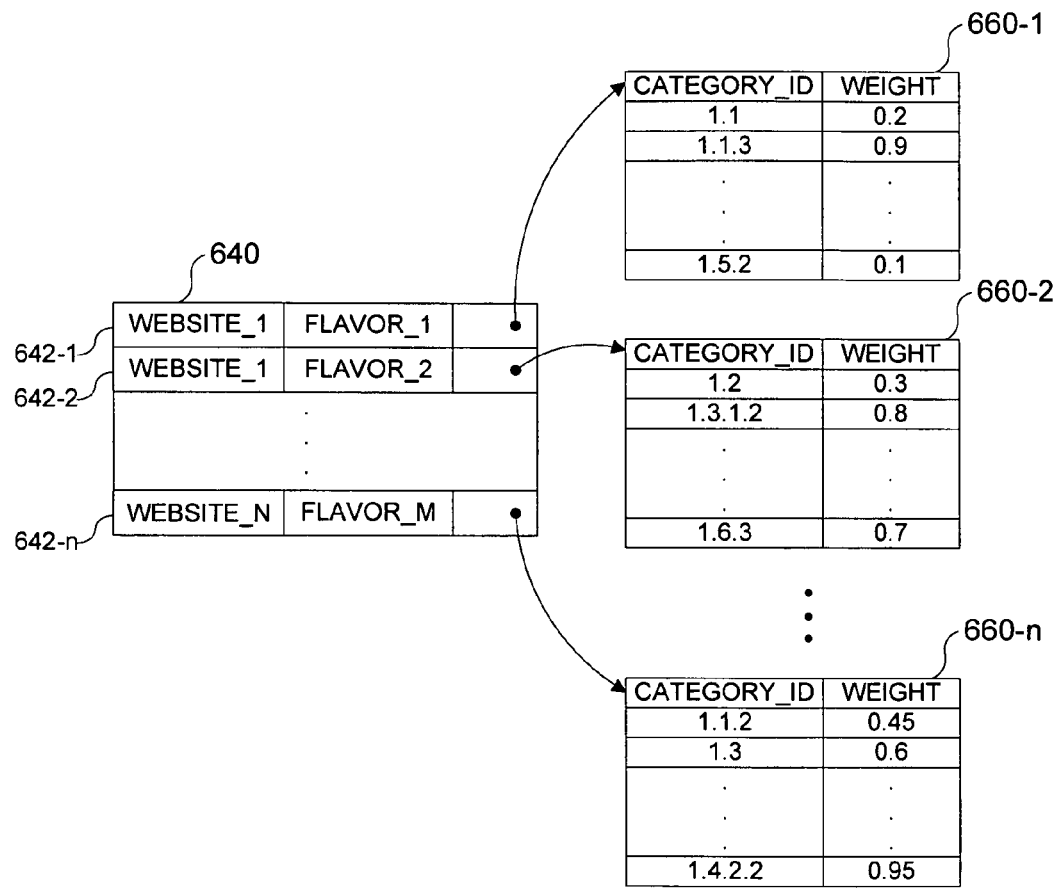
FIG. 6B is a block diagram of an exemplary data structure that may be used for storing category-based website profiles in accordance with some embodiments of the present invention.

FIG. 6B is a block diagram of an exemplary data structure, a category-based website profile table 650, which may be used for storing category-based website profiles in accordance with some embodiments of the present invention. The category-based profile table 650 includes a table 640 having a plurality of records 642, each record including a WEBSITE_ID, a FLAVOR_ID and a pointer pointing to another data structure, such as table 660-1. A website may have one or more flavors to better serve different user groups. For example, the website "WEBSITE_1" has at least two different flavors, "FLAVOR_1" and "FLAVOR_2." These two different "flavors" may correspond to different search boxes on different webpages. In other words, the introduction of different flavors for a website refines the interests of the website users. This is particularly useful for a popular website serving a broad spectrum of customers. Table 660-1 includes two columns, CATEGORY_ID and WEIGHT. The CATEGORY_ID column contains a category's identifier as shown in FIG. 6A, and the value in the WEIGHT column indicates the relevance of the category to the interests of the website users.

In some embodiments, the search history items are automatically classified into different clusters. Clusters are usually more dynamic than categories. As noted above, categories are typically pre-generated. Search history items associated with different websites are classified against the same set of categories. In contrast, there may not be a pre-defined set of clusters for a particular website. The search history items associated with the website fall into an automatically generated set of clusters. Therefore, clusters may be better tailored to characterize the interests and preferences of the users of the website. For convenience, many discussions of the present invention use categories as an example. But it will be clear to one skilled in the art that the underlying algorithms are also applicable to clusters with no or little adjustment.

The website profile based upon the category map 600 is a topic-oriented implementation. The items in a category-based profile can also be organized in other ways. In one embodiment, the interests of the website users can be categorized based on the formats of the documents identified by the website users, such as HTML, plain text, PDF, Microsoft Word, etc. Different formats may have different weights. In another embodiment, the interests of the website users can be categorized according to the types of the identified documents, e.g., an organization's homepage, a person's homepage, a research paper, or a news group posting, each type having an associated weight. Documents can also be categorized by document origin, for instance the country associated with each document's host. In yet another embodiment, two or more of the above-identified category-based profiles may co-exist, with each one reflecting a respective aspect of the interests of the website users.

Figures 7, 8:
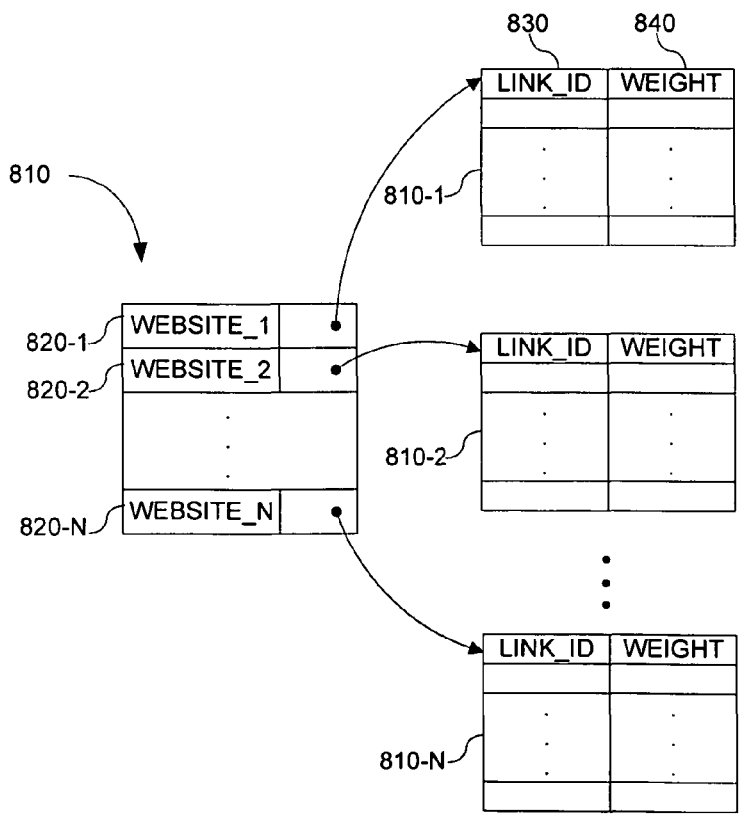
FIG. 7 is a block diagram of an exemplary data structure that may be used for storing term-based website profiles in accordance with some embodiments of the present invention.
FIG. 8 is a block diagram of an exemplary data structure that may be used for storing link-based website profiles in accordance with some embodiments of the present invention.

FIG. 7 is a block diagram of an exemplary data structure, a term-based profile table 700, which may be used for storing term-based website profiles in accordance with some embodiments of the present invention. The table 700 includes a plurality of records 710, each record corresponding to a website's term-based profile. A term-based profile record 710 includes a plurality of columns including a WEBSITE_ID column 720 and multiple columns of (TERM, WEIGHT) pairs 740. The WEBSITE_ID column stores a website identifier. Each (TERM, WEIGHT) pair 740 includes a term of typically one to three words that is deemed relevant to the interests of the website users and a weight associated with the term indicating the relevance of the term. The weight of a term is not necessarily a positive value. A negative weight suggests that the website users disfavor documents including this term in the search results.

Besides term-based and category-based profiles, another type of website profile is referred to as a link-based profile. As discussed above, the page rank of a document is based on the link structure that connects the document to other documents on the Internet. A document having more links pointing to it is often assigned a higher page rank and is therefore deemed more popular by the search engine. Link information of documents selected by a website's users can be used to infer the interests of the website's users. In one embodiment, a list of preferred URLs is identified for the website users by analyzing the click rate of these URLs. Each preferred URL may be further weighted according to the mouse hovering time by the website users at the URL. In another embodiment, a list of preferred web hosts is identified for the website users by analyzing the users' visit rate at different web hosts. When two or more preferred URLs are related to the same web host, the weights of the two or more URLs may be combined as the weight of the web host.

FIG. 8 is a block diagram of an exemplary data structure that may be used for storing link-based website profiles in accordance with some embodiments of the present invention. The link-based profile table 800 includes a table 810 that includes a plurality of records 820, each record including a WEBSITE_ID and a pointer pointing to another data structure, such as table 810-1. Table 810-1 may include two columns, LINK_ID 830 and WEIGHT 840. The LINK_ID 830 may be associated with a preferred URL or host. The actual URL/host may be stored in the table instead of the LINK_ID, however it is preferable to store the LINK_ID to save storage space.

A preferred list of URLs and/or hosts includes URLs and/or hosts that have been directly identified by the website users. The preferred list of URLs and/or host may further extend to URLs and/or hosts indirectly identified by using methods such as collaborative filtering or bibliometric analysis, which are known to one of ordinary skill in the art. In one embodiment, the indirectly identified URLs and/or host include URLs or hosts that have links to/from the directly identified URLs and/or hosts. These indirectly identified URLs and/or hosts are weighted by the distance between them and the directly identified URLs or hosts. For example, when a directly identified URL or host has a weight of 1, URLs or hosts that are one link away may have a weight of 0.5, URLs or hosts that are two links away may have a weight of 0.25, etc. This procedure can be further refined by reducing the weight of links that are not related to the topic of the original URL or host, e.g., links to copyright pages or web browser software that can be used to view the documents associated with the user-selected URL or host. Irrelevant Links can be identified based on their context or their distribution. For example, copyright links often use specific terms (e.g., "copyright" and "All rights reserved" are commonly used terms in the anchor text of a copyright link); and links to a website from many unrelated websites may suggest that this website is not topically related (e.g., links to the Internet Explorer website are often included in unrelated websites). The indirect links can also be classified according to a set of topics and links with very different topics may be excluded or be assigned a low weight.

The three types of website profiles discussed above are generally complimentary to one another since different profiles characterize the interests of the website users from different vantage points. However, this does not mean that one type of website profile, e.g., the category-based profile, is incapable of playing a role that is typically played by another type of website profile. By way of example, a preferred URL or host in a link-based profile is often associated with a specific topic, e.g., finance.yahoo.com is a URL focusing on financial news. Therefore, what is achieved by a link-based profile that comprises a list of preferred URLs or hosts may also be achievable, at least in part, by a category-based profile that has a set of categories that cover the same topics covered by preferred URLs or hosts.

Figure 9:
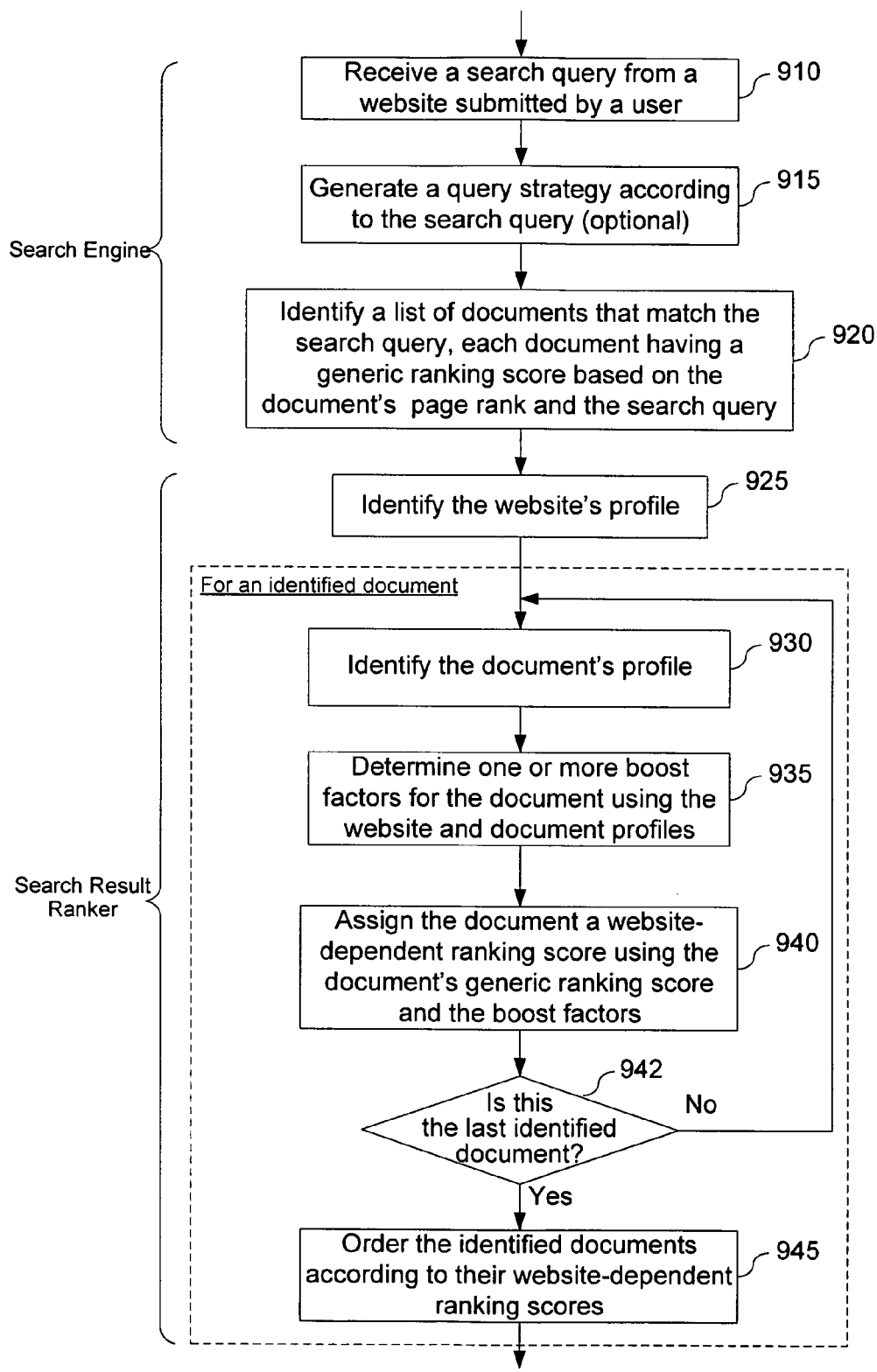
FIG. 9 is a flow diagram of a process for generating website-dependent search results using website profiles in accordance with some embodiments of the present invention.

FIG. 9 is a flow diagram of a process for generating website-dependent search results using the various types of website profiles in accordance with some embodiments of the present invention. Initially, the search engine 122 receives a search query from a website 102 submitted by a user through a client 103 (910). In response, the search engine 122 may optionally generate a query strategy (915). For example, the search query is normalized so as to be in proper form for further processing, and/or the search query may be modified in accordance with predefined criteria so as to automatically broaden or narrow the scope of the search query. Next, the search engine 122 submits the search query (or the query strategy, if one is generated) to the content database 124. The content database 124 identifies a set of documents that match the search query (920), each document having a generic ranking score that depends on the document's page rank and the search query. All three operations (910, 915 and 920) are typically conducted by the search engine 122.

In some embodiments, the requesting website's identifier is embedded in the search query. Based on the website identifier, the search result ranker 126 identifies the website's profile in the website profile database 128 (925). Next, the search result ranker 126 analyzes each identified document to determine one or more boost factors using the website profile (935) and then assigns the document a website-dependent ranking score using the document's generic ranking score and the boost factors (940). The search result ranker 126 iterates the process for every identified document (942). Finally, the search result ranker 126 re-orders the list of documents according to their website-dependent ranking scores (945) and sends a search result including links to the list of documents to the requesting client 103.

In some embodiments, the analysis of an identified document at 935 includes determining a correlation between the document's content and the website's profile. Furthermore, in some embodiments, this operation includes accessing a previously computed document profile for the document and then determining a correlation between the document profile and the website's profile. In some embodiments, determining the correlation includes one or more operations that are "dot product" computations, which determine the extent of overlap, if any, between the document profile and the website's profile.

FIG. 10 is a block diagram of exemplary data structures that may be used for storing category-based, term-based, and link-based boost factors for documents in the search results in accordance with some embodiments of the present invention. For each candidate document, each identified by a respective DOC_ID, category-based document information table 1010 includes a plurality of identified categories and associated weights, term-based document information table 1030 includes multiple pairs of relevant terms and associated weights, and link-based document information table 1050 includes a set of links and corresponding weights.

The rightmost column of each of the three tables (1010, 1030 and 1050) stores the boost factor (i.e., a computed score) of a document when the document is evaluated using one specific type of website profile. A document's boost factor can be determined by combining the weights of the items associated with the document. For instance, a category-based or term-based boost factor may be computed as follows. The users of a website may favor documents related to science with a weight of 0.6, and disfavor documents related to business with a weight of −0.2. Thus, when a science document matches a search query, it will be boosted over a business document. In general, the document topic classification may not be exclusive. A candidate document may be classified as being a science document with probability of 0.8 and a business document with probability of 0.4. A link-based boost factor may be computed based on the relative weights allocated to the preferred URLs or hosts in the link-based profile. In one embodiment, the term-based profile rank can be determined using known techniques, such as the term frequency-inverse document frequency (TF-IDF). The term frequency of a term is a function of the number of times the term appears in a document. The inverse document frequency is an inverse function of the number of documents in which the term appears within a collection of documents. For example, very common terms like "word" occur in many documents and consequently are assigned a relatively low inverse document frequency, while less common terms like "photograph" and "microprocessor" are assigned a relatively high inverse document frequency.

In some embodiments, when a search engine generates a search result in response to a search query, a candidate document D that satisfies the search query is assigned a query score, QueryScore, in accordance with the search query. This query score is then modulated by document D's page rank, PageRank, to generate a generic ranking score, GenericScore, that is expressed as $$GenericScore = QueryScore * PageRank.$$

This generic ranking score may not appropriately reflect document D's relevance to a particular website's users if the users' interest is dramatically different from that of a random user of the search engine. The relevance of document D to the website users can be accurately characterized by a set of boost factors, based on the correlation between document D's content and the website's term-based profile, herein called the TermBoostFactor, the correlation between one or more categories associated with document D and the website's category-based profile, herein called the CategoryBoostFactor, and the correlation between the URL and/or host of document D and the website's link-based profile, herein called the LinkBoostFactor. Therefore, document D may be assigned a website-dependent ranking score that is a function of both the document's generic ranking score and the various website profile-based boost factors. In one embodiment, this website-dependent ranking score can be expressed as:

$$WebsiteScore = GenericScore * (TermBoostFactor + CategoryBoostFactor + LinkBoostFactor).$$

In another embodiment, in which the website profile is a single profile, the website-dependent ranking score can be expressed as:

$$WebsiteScore = GenericScore * BoostFactor$$

where the "BoostFactor" is based on the correlation between document D's content and the website's profile.

Figure 11:
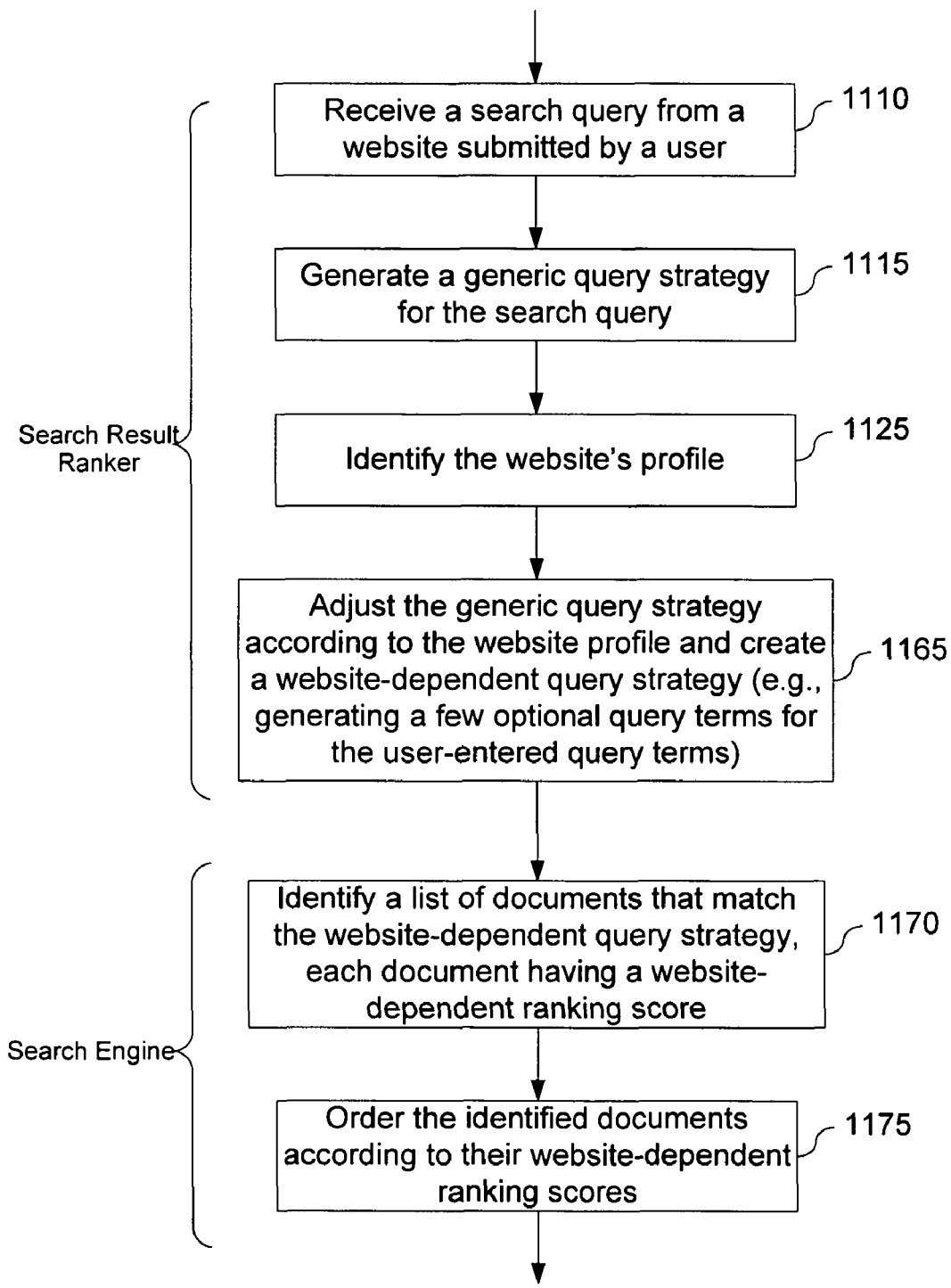
FIG. 11 is a flow diagram of another process for generating website-dependent search results using website profiles in accordance with some embodiments of the present invention.

FIG. 11 is a flow diagram of another process for generating website-dependent search results using website profiles in accordance with some embodiments of the present invention. Unlike the embodiment discussed above in connection with FIG. 9, the generic query strategy is modulated by the website's profile to create a website-dependent query strategy (1125, 1165). For example, relevant terms from the website profile may be added to the search query with associated weights. In various embodiments, the website-dependent query strategy is created by the search engine 122, the front end server 120, or the search result ranker 126, respectively. In some other embodiments, the requesting website 102 has a copy of its profile generated by the website profiler 129 and the website-dependent query strategy is created by the requesting website 102. Next, the search engine 122 searches the content database 124 using the website-dependent query strategy (1170). As a result, the documents identified by the content database 124 are implicitly ordered by their associated website-dependent ranking score (1175).

Some embodiments include a computer program product for use in conjunction with a computer system associated with a search engine. The computer program product may comprise a computer readable storage medium and a computer program mechanism embedded therein. In some embodiments, the computer program mechanism includes instructions for receiving from a website distinct from the search engine multiple search queries submitted by users; instructions for providing to the requesting users search results responsive to the search queries; instructions for monitoring activities of the users on the search results; and instructions for generating a profile for the website using the search queries from the website and the user activities on the search results.

Figure 12:
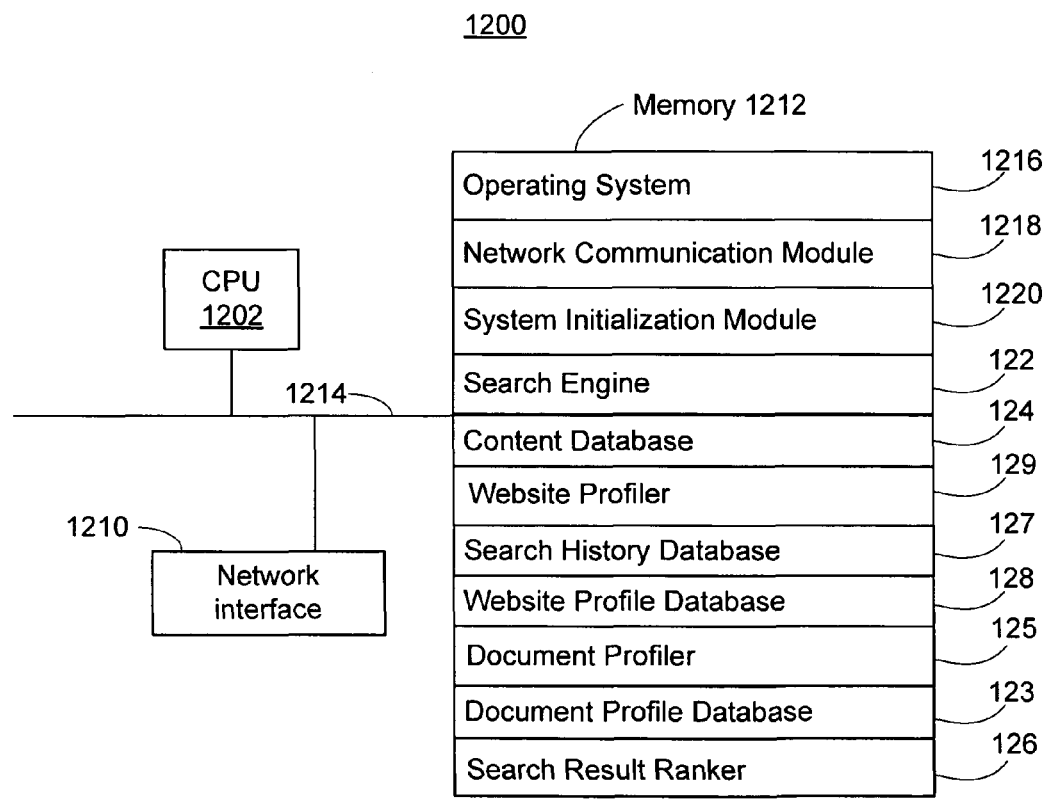
FIG. 12 is a block diagram of an exemplary information server in accordance with some embodiments of the present invention.

Referring to FIG. 12, an exemplary information server 1200 typically includes one or more processing units (CPU's)

1202, one or more network or other communications interfaces 1210, memory 1212, and one or more communication buses 1014 for interconnecting these components. The communication buses 1014 may include circuitry (sometimes called a chipset) that interconnects and controls communications between system components. The system 1200 may optionally include a user interface, for instance a display and a keyboard. Memory 1212 may include high speed random access memory and may also include non-volatile memory, such as one or more magnetic disk storage devices. Memory 1212 may include mass storage that is remotely located from the CPU's 1202. In some embodiments, memory 1212 stores the following programs, modules and data structures, or a subset or superset thereof:

- an operating system 1216 that includes procedures for handling various basic system services and for performing hardware dependent tasks;
- a network communication module 1218 that is used for connecting the information server 1200 to other servers or computers via one or more communication networks (wired or wireless), such as the Internet, other wide area networks, local area networks, metropolitan area networks, and so on;
- a system initialization module 1220 that initializes other modules and data structures stored in memory 1212 required for the appropriate operation of the information server 1200;
- a search engine 122 for processing a search query, identifying and ordering a search result according to the search query;
- a content database 124 for storing a plurality of indexed document retrieved from the Internet;
- a website profiler 129 for processing search history associated with a website and creating and updating one or more profiles that characterize the interests of the website users;
- a search history database 127 for storing search histories associated with different websites including search queries, search results and user activities;
- a website profile database 123 for storing website profiles associated with different websites on the Internet;
- a document profiler 125 for analyzing a document's content and context and creating a profile for the document;
- a document profile database 123 for storing document profiles associated with different documents stored in the content database 124; and
- a search result ranker 126 for generating a website-dependent ranking score for each document identified by the search engine 122 using a website profile and re-ordering the documents in a search result in accordance with their website-dependent ranking scores.

In some embodiments, the information server 106 may not have access to all the search history associated with a website. For example, there may be an agreement between a website 102 and the information server 106 with respect to the search queries submitted from the website 102. According to the agreement, when a user visiting the website 1027 submits a search query to the information server 106, the information server 106 is required to send the corresponding search result to the website 102 rather than the requesting user at a client 103. The website 102 may modify the search result, e.g., attaching advertisements or other information to the search result, and then serves the modified search result to the requesting user at the client 103.

In this scenario, the information server 106 may have no information identifying the requesting user and the client 103, and may also be unable to monitor the user's activities on the search result. For example, the information server 106 may not receive any information identifying the document links in the search result that have been clicked by the user. Similarly, the information server 106 may not receive any information identifying the document links over which the user moves his or her mouse link and the corresponding mouse hovering time. In other words, the information server 106 has very limited or no exposure to the activities of the website users on the search results. Therefore, the information server 106 has to rely on the user activities on the search results from other venues to generate the website profile.

In some embodiments, by examining the search queries submitted from different website, the information server 106 may identify another website similar to the website in question. Two websites are deemed similar if a predefined number or percentage of search queries submitted from the two websites is identical. It is also reasonable to infer that users of the two similar websites may have similar interests and therefore the user activities associated with one website are a reasonable proxy of the user activities associated with the other one. If the information server 106 can access the user activities associated with one of the two websites (e.g., there is no agreement to deliver the search results to the website), the information server 106 can use the same user activities to create the profile for other website.

When there is no other website similar to the website in question, the information server 106 may utilize monitored user activities associated with search queries submitted directly to the search engine (e.g., search queries submitted using a toolbar search box or a webpage associated with the information server 106) as the proxy of a particular website. However, the only search queries for which such "general user population" information will be used are queries that were submitted from the website in question. For instance, the search query "golf courses in mountain view" may be submitted both to a golf-focused website, and to a general purpose search engine. Profile information developed from general user population clicks on the search result of this search query (as well as general use population clicks on the search results of other search queries submitted both from the website in question and from other users of the search engine) are used to generate the profile for a respective website by combining or aggregating the general user statistical information for the queries received from the respective website. The website profile obtained in this way will typically differ significantly from a group profile of the entire user community of the search engine, and therefore the website profile generated in this way will be a reasonable approximation of the website profile that would be generated if user activity information were available for search results returned by the search engine in response to search queries submitted from the website.

In some embodiments, the website profiles can also be used to select advertisements for search queries submitted from different websites. Different advertisements are treated in a way similar to different documents. For example, an advertisement may have a set of key terms. A correlation of this set of key terms with a term-based profile (or a category-based profile, or both) associated with a website produces a booster factor for the advertisement. This boost factor may be used to promote or demote the particular advertisement in response to a search query submitted from the website. For example, when the information server 106 receives a search query "world cup 2006" from a website or webpage devoted to soccer news, it may promote those advertisements covering soccer gears, ticket sale for the 2006 FIFA World Cup Germany, and hotel reservations at the German cities hosting the soccer game. etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of providing search results, comprising:
   at a server associated with a search engine:
   receiving from first and second websites distinct from the search engine, a same search query, wherein the search query is submitted by a first user visiting the first website from a first client and by a second user visiting the second website from a second client;
   identifying a plurality of information items associated with the search query; and
   responsive to the search query received from the first website, providing to the first user visiting the first website from the first client a first subset of the information items in a first order, and responsive to the search query received from the first website, providing to the second user visiting the second website from the second client a second subset of the information items in a second order distinct from the first order,
   wherein the first order is determined, at least in part, by a first website profile associated with the first website and the second order is determined, at least in part, by a second website profile associated with the second website,
   wherein the first website profile is associated with a first website identifier of the first website and the search query received from the first website is associated with the first website identifier, and the second website profile is associated with a second website identifier of the second website that is distinct from the first website identifier, and the search query received from the second website is associated with the second website identifier,
   wherein the first website profile is related to a search history of the first website, the search history of the first website including search queries submitted by multiple users visiting the first website from respective clients, search results responsive to the search queries, and user activities by the multiple users visiting the first website on the search results, and the second website profile is related to a search history of the second website, the search history of the second website including search queries submitted by multiple users visiting the second website from respective clients, search results responsive to the search queries, and user activities by the multiple users visiting the second website on the search results.

2. The method of claim 1, including generating the first and second website profiles for the first and second websites in accordance with their respective search histories.

3. The method of claim 1, wherein the information items include at least one advertisement.

4. A computer-implemented method of providing search results, comprising:
   at a server associated with a search engine:
   receiving from first and second webpages of a website distinct from the search engine, multiple ones of a same search query, wherein the search query is submitted by a first user visiting the first webpage from a first client and by a second user visiting the second webpage from a second client;
   identifying a plurality of information items associated with the search query; and
   responsive to the search query received from the first webpage, providing to the first user visiting the first webpage from the first client a first subset of the information items in a first order, and responsive to the search query received from the first webpage, providing to the second user visiting the second webpage from the second client a second subset of the information items in a second order distinct from the first order;
   wherein the first order is determined, at least in part, by a first webpage profile associated with the first webpage and the second order is determined, at least in part, by a second webpage profile associated with the second webpage;
   wherein the first webpage profile is associated with a first webpage identifier of the first webpage and the search query received from the first webpage is associated with the first webpage identifier, and the second profile is associated with a second webpage identifier of the second webpage that is distinct from the first webpage identifier, and the search query received from the second webpage is associated with the second webpage identifier;
   wherein the first webpage profile is related to a search history of the first webpage, the search history of the first webpage including search queries submitted by multiple users visiting the first webpage from respective clients, search results responsive to the search queries, and user activities by the multiple users visiting the first webpage on the search results, and the second webpage profile is related to a search history of the second webpage, the search history of the second webpage including search queries submitted by multiple users visiting the second webpage from respective clients, search results responsive to the search queries, and user activities by the multiple users visiting the second webpage on the search results.

5. The method of claim 4, including generating the first and second webpage profiles for the first and second webpages in accordance with their respective search histories.

6. The method of claim 4, wherein the information items include at least one advertisement.

7. The method of claim 4, including
   generating the first webpage profile for the first webpage using user activities on search results responsive to the search queries submitted by the multiple users visiting the first webpage, wherein the generated first webpage profile is associated with the first webpage identifier and is used by the search engine to rank search results provided to respective users of the first webpage in response to future search queries from the first webpage, and
   generating the second webpage profile for the second webpage using user activities on search results responsive to the search queries submitted by the multiple users visiting the second webpage, wherein the generated second webpage profile is associated with the second webpage identifier and is used by the search engine to rank search results provided to respective users of the second webpage in response to future search queries from the second webpage.

8. The method of claim 1, including generating the first website profile for the first website using user activities on search results responsive to the search queries submitted by the multiple users visiting the first website, wherein the generated first website profile is associated with the first website identifier and is used by the search engine to rank search results provided to respective users of the first website in response to future search queries from the first website, and generating the second website profile for the second website using user activities on search results responsive to the search queries submitted by the multiple users visiting the second website, wherein the generated second website profile is associated with the second website identifier and is used by the search engine to rank search results provided to respective users of the second website in response to future search queries from the second website.

9. A computer system associated with a search engine for providing search results, comprising:

memory;

one or more processors; and one or more programs, stored in the memory and executed by the one or more processors, the one or more programs including:

instructions for receiving from first and second websites distinct from the search engine, a same search query, wherein the search query is submitted by a first user visiting the first website from a first client and by a second user visiting the second website from a second client;

instructions for identifying a plurality of information items associated with the search query; and instructions for responding to the search query received from the first website by providing to the first user visiting the first website from the first client a first subset of the information items in a first order and responding to the search query received from the second website by providing to the second user visiting the second website from the second client a second subset of the information items in a second order distinct from the first order;

wherein the first order is determined, at least in part, by a first website profile associated with the first website and the second order is determined, at least in part, by a second website profile associated with the second website, wherein the first website profile is associated with a first website identifier of the first website and the search query received from the first website is associated with the first website identifier, and the second website profile is associated with a second website identifier of the second website that is distinct from the first website identifier, and the search query received from the second website is associated with the second website identifier, wherein the first website profile is related to a search history of the first website, the search history of the first website including search queries submitted by multiple users visiting the first website from respective clients, search results responsive to the search queries, and user activities by the multiple users visiting the first website on the search results, and the second website profile is related to a search history of the second website, the search history of the second website including search queries submitted by multiple users visiting the second website from respective clients, search results responsive to the search queries, and user activities by the multiple users visiting the second website on the search results.

10. The computer system of claim 9, wherein the one or more programs further include instructions for generating the first and second website profiles for the first and second websites in accordance with their respective search histories.

11. The computer system of claim 9, wherein the information items include at least one advertisement.

12. The computer system of claim 9, wherein the one or more programs further include:

instructions for generating the first website profile for the first website using user activities on search results responsive to the search queries submitted by the multiple users visiting the first website, wherein the generated first website profile is associated with the first website identifier and is used by the search engine to rank search results provided to respective users of the first website in response to future search queries from the first website, and instructions for generating the second website profile for the second website using user activities on search results responsive to the search queries submitted by the multiple users visiting the second website, wherein the generated second website profile is associated with the second website identifier and is used by the search engine to rank search results provided to respective users of the second website in response to future search queries from the second website.

13. A non-transitory computer readable storage medium for use in conjunction with a computer system associated with a search engine, the computer readable storage medium storing one or more programs for execution by the computer system, the one or more programs comprising:

instructions for receiving from first and second websites distinct from the search engine, a same search query, wherein the search query is submitted by a first user visiting the first website from a first client and by a second user visiting the second website from a second client;

instructions for identifying a plurality of information items associated with the search query; and instructions for responding to the search query received from the first website by providing to the first user visiting the first website from the first client a first subset of the information items in a first order and responding to the search query received from the second website by providing to the second user visiting the second website from the second client a second subset of the information items in a second order distinct from the first order;

wherein the first order is determined, at least in part, by a first website profile associated with the first website and the second order is determined, at least in part, by a second website profile associated with the second website, wherein the first website profile is associated with a first website identifier of the first website and the search query received from the first website is associated with the first website identifier, and the second website profile is associated with a second website identifier of the second website that is distinct from the first website identifier, and the search query received from the second website is associated with the second website identifier, wherein the first website profile is related to a search history of the first website, the search history of the first website including search queries submitted by multiple users visiting the first website from respective clients, search results responsive to the search queries, and user activities by the multiple users visiting the first website on the search results, and the second website profile is related to a search history of the second website, the search history of the second website including search queries submitted by multiple users visiting the second website from respective clients, search results responsive to the search queries, and user activities by the multiple users visiting the second website on the search results.

14. The non-transitory computer readable storage medium of claim 13, further including instructions for generating the first and second website profiles for the first and second websites in accordance with their respective search histories.

15. The non-transitory computer readable storage medium of claim 13, wherein the information items include at least one advertisement.

16. The non-transitory computer readable storage medium of claim 13, wherein the one or more programs further include:
  instructions for generating the first website profile for the first website using user activities on search results responsive to the search queries submitted by the multiple users visiting the first website, wherein the generated first website profile is associated with the first website identifier and is used by the search engine to rank search results provided to respective users of the first website in response to future search queries from the first website, and
  instructions for generating the second website profile for the second website using user activities on search results responsive to the search queries submitted by the multiple users visiting the second website, wherein the generated second website profile is associated with the second website identifier and is used by the search engine to rank search results provided to respective users of the second website in response to future search queries from the second website.

17. A computer system associated with a search engine for providing search results, comprising:
  memory;
  one or more processors; and
  one or more programs, stored in the memory and executed by the one or more processors, the one or more programs including:
    instructions for receiving from first and second webpages of a website distinct from the search engine, multiple ones of a same search query, wherein the search query is submitted by a first user visiting the first webpage from a first client and by a second user visiting the second webpage from a second client;
    instructions for identifying a plurality of information items associated with the search query; and
    instructions for responding to the search query received from the first webpage by providing to the first user visiting the first webpage from the first client a first subset of the information items in a first order and responding to the search query received from the second webpage by to the second user visiting the second webpage from the second client a second subset of the information items in a second order distinct from the first order;
  wherein the first order is determined, at least in part, by a first webpage profile associated with the first webpage and the second order is determined, at least in part, by a second webpage profile associated with the second webpage;
  wherein the first webpage profile is associated with a first webpage identifier of the first webpage and the search query received from the first webpage is associated with the first webpage identifier, and the second profile is associated with a second webpage identifier of the second webpage that is distinct from the first webpage identifier, and the search query received from the second webpage is associated with the second webpage identifier;
  wherein the first webpage profile is related to a search history of search queries submitted by multiple users visiting the first webpage from respective clients and the second webpage profile is related to a search history of search queries submitted by multiple users visiting the second webpage from respective clients
  wherein the first webpage profile is related to a search history of the first webpage, the search history of the first webpage including search queries submitted by multiple users visiting the first webpage from respective clients, search results responsive to the search queries, and user activities by the multiple users visiting the first webpage on the search results, and the second webpage profile is related to a search history of the second webpage, the search history of the second webpage including search queries submitted by multiple users visiting the second webpage from respective clients, search results responsive to the search queries, and user activities by the multiple users visiting the second webpage on the search results.

18. The computer system of claim 17, further generating the first and second webpage profiles for the first and second webpages in accordance with their respective search histories.

19. The computer system of claim 17, wherein the information items include at least one advertisement.

20. The computer system of claim 17, wherein the one or more programs further include:
  instructions for generating the first webpage profile for the first webpage using user activities on search results responsive to the search queries submitted by the multiple users visiting the first webpage, wherein the generated first webpage profile is associated with the first webpage identifier and is used by the search engine to rank search results provided to respective users of the first webpage in response to future search queries from the first webpage, and
  instructions for generating the second webpage profile for the second webpage using user activities on search results responsive to the search queries submitted by the multiple users visiting the second webpage, wherein the generated second webpage profile is associated with the second webpage identifier and is used by the search engine to rank search results provided to respective users of the second webpage in response to future search queries from the second webpage.

21. A non-transitory computer readable storage medium for use in conjunction with a computer system associated with a search engine, the computer readable storage medium storing one or more programs for execution by the computer system, the one or more programs comprising:
  instructions for receiving from first and second webpages of a website distinct from the search engine, multiple ones of a same search query, wherein the search query is submitted by a first user visiting the first webpage from a first client and by a second user visiting the second webpage from a second client;

instructions for identifying a plurality of information items associated with the search query; and instructions for responding to the search query received from the first webpage by providing to the first user visiting the first webpage from the first client a first subset of the information items in a first order and responding to the search query received from the second webpage by to the second user visiting the second webpage from the second client a second subset of the information items in a second order distinct from the first order;

wherein the first order is determined, at least in part, by a first webpage profile associated with the first webpage and the second order is determined, at least in part, by a second webpage profile associated with the second webpage;

wherein the first webpage profile is associated with a first webpage identifier of the first webpage and the search query received from the first webpage is associated with the first webpage identifier, and the second profile is associated with a second webpage identifier of the second webpage that is distinct from the first webpage identifier, and the search query received from the second webpage is associated with the second webpage identifier;

wherein the first webpage profile is related to a search history of the first webpage, the search history of the first webpage including search queries submitted by multiple users visiting the first webpage from respective clients, search results responsive to the search queries, and user activities by the multiple users visiting the first webpage on the search results, and the second webpage profile is related to a search history of the second webpage, the search history of the second webpage including search queries submitted by multiple users visiting the second webpage from respective clients, search results responsive to the search queries, and user activities by the multiple users visiting the second webpage on the search results.

22. The non-transitory computer readable storage medium of claim 21, further generating the first and second webpage profiles for the first and second webpages in accordance with their respective search histories.

23. The non-transitory computer readable storage medium of claim 21, wherein the information items include at least one advertisement.

24. The non-transitory computer readable storage medium of claim 21, wherein the one or more programs further include:

instructions for generating the first webpage profile for the first webpage using user activities on search results responsive to the search queries submitted by the multiple users visiting the first webpage, wherein the generated first webpage profile is associated with the first webpage identifier and is used by the search engine to rank search results provided to respective users of the first webpage in response to future search queries from the first webpage, and instructions for generating the second webpage profile for the second webpage using user activities on search results responsive to the search queries submitted by the multiple users visiting the second webpage, wherein the generated second webpage profile is associated with the second webpage identifier and is used by the search engine to rank search results provided to respective users of the second webpage in response to future search queries from the second webpage.

* * * * *

UNITED STATES PATENT AND TRADEMARK OFFICE
CERTIFICATE OF CORRECTION

| | |
|---|---|
| PATENT NO. | : 8,078,607 B2 |
| APPLICATION NO. | : 11/394620 |
| DATED | : December 13, 2011 |
| INVENTOR(S) | : Oztekin et al. |

It is certified that error appears in the above-identified patent and that said Letters Patent is hereby corrected as shown below:

Title Page, Item (54), please delete "WEBISTES" and insert -- WEBSITES --;

In Column 1, line 2, please delete "WEBISTES" and insert -- WEBSITES --.

Signed and Sealed this

Seventh Day of February, 2012

David J. Kappos
*Director of the United States Patent and Trademark Office*